(12) United States Patent
Pouzin et al.

(10) Patent No.: US 9,729,488 B2
(45) Date of Patent: *Aug. 8, 2017

(54) ON-DEMAND MAILBOX SYNCHRONIZATION AND MIGRATION SYSTEM

(71) Applicant: BITTITAN INC., Kirkland, WA (US)

(72) Inventors: Dominic Justin Pouzin, Sammamish, WA (US); Geeman Yip, Kirkland, WA (US)

(73) Assignee: BITTITAN INC., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,473

(22) Filed: Dec. 10, 2014

(65) Prior Publication Data
US 2015/0100655 A1 Apr. 9, 2015

Related U.S. Application Data

(63) Continuation of application No. 12/961,268, filed on Dec. 6, 2010, now Pat. No. 8,938,510.

(60) Provisional application No. 61/328,003, filed on Apr. 26, 2010.

(51) Int. Cl.
| | |
|---|---|
| *G06F 15/16* | (2006.01) |
| *H04L 12/58* | (2006.01) |
| *G06F 9/50* | (2006.01) |
| *G06Q 10/10* | (2012.01) |

(52) U.S. Cl.
CPC ............ *H04L 51/22* (2013.01); *G06F 9/5011* (2013.01); *G06Q 10/107* (2013.01); *H04L 51/28* (2013.01)

(58) Field of Classification Search
CPC ......... H04L 12/58; H04L 51/28; H04L 51/22; G06Q 10/107; G06F 9/5011
USPC ........................................................ 709/206
See application file for complete search history.

(56) References Cited

U.S. PATENT DOCUMENTS

| | | | |
|---|---|---|---|
| 5,915,004 A | 6/1999 | Pabbati et al. | |
| 6,208,717 B1 | 3/2001 | Yeh et al. | |
| 6,502,191 B1 | 12/2002 | Smith et al. | |
| 6,735,691 B1* | 5/2004 | Capps ................. | G06F 9/44505 713/1 |
| 7,313,560 B2 | 12/2007 | Dilley, Jr. et al. | |
| 7,320,068 B2 | 1/2008 | Zimniewicz et al. | |
| 7,493,394 B2 | 2/2009 | Zavalkovsky | |
| 7,577,805 B2 | 8/2009 | Amano et al. | |
| 7,710,874 B2 | 5/2010 | Balakrishnan et al. | |

(Continued)

OTHER PUBLICATIONS

SBS Bloggers, "The Windows Server Essentials and Small Business Blog—SBS 2008—How to Export and Import Mailboxes to and From PST", SBS 2008, Jan. 13, 2009.

(Continued)

*Primary Examiner* — Tauqir Hussain
(74) *Attorney, Agent, or Firm* — Dorsey & Whitney LLP

(57) ABSTRACT

A system for managing physical and logical resources to provide on-demand synchronization or migration of mailboxes and their corresponding content. Physical resources are managed by automatically assigning mailbox processing tasks to either reserved computing resources, or computing resources dynamically obtained from cloud computing services. Authentication resources are managed by automatically requesting credentials from users, accepting submitted credentials, and initiating mailbox processing tasks.

38 Claims, 11 Drawing Sheets

(56) References Cited

U.S. PATENT DOCUMENTS

| | | | |
|---|---|---|---|
| 8,250,215 B2 | 8/2012 | Stienhans et al. | |
| 8,272,031 B2 | 9/2012 | Abderrazzaq et al. | |
| 8,285,817 B1 | 10/2012 | Balasubramanian et al. | |
| 8,307,362 B1 | 11/2012 | Gong et al. | |
| 8,849,955 B2 | 9/2014 | Prahlad et al. | |
| 8,938,510 B2 | 1/2015 | Pouzin et al. | |
| 9,367,577 B2 | 6/2016 | Lee et al. | |
| 2002/0112007 A1 | 8/2002 | Wood et al. | |
| 2002/0169907 A1 | 11/2002 | Candea et al. | |
| 2004/0073639 A1* | 4/2004 | Basoglu | G06F 9/5083 709/223 |
| 2004/0146147 A1 | 7/2004 | Picard et al. | |
| 2004/0215709 A1 | 10/2004 | Basani et al. | |
| 2004/0267890 A1 | 12/2004 | Soulet | |
| 2005/0164703 A1 | 7/2005 | Huynh | |
| 2005/0246518 A1 | 11/2005 | Takahashi | |
| 2005/0267938 A1 | 12/2005 | Czeczulin | |
| 2006/0173908 A1 | 8/2006 | Browning et al. | |
| 2006/0190493 A1 | 8/2006 | Kawai et al. | |
| 2007/0073573 A1 | 3/2007 | Gerhard et al. | |
| 2007/0073818 A1* | 3/2007 | Gardner | G06Q 10/107 709/206 |
| 2008/0028100 A1* | 1/2008 | Adelman | G06Q 10/107 709/245 |
| 2008/0109448 A1* | 5/2008 | Aboel-Nil | G06Q 10/107 |
| 2008/0243930 A1 | 10/2008 | Browning et al. | |
| 2009/0144743 A1* | 6/2009 | Wolslegel | G06Q 10/107 718/105 |
| 2009/0187632 A1 | 7/2009 | Alarid et al. | |
| 2009/0276771 A1 | 11/2009 | Nickolov et al. | |
| 2010/0011033 A1 | 1/2010 | Czeczulin | |
| 2010/0036923 A1 | 2/2010 | Byrne et al. | |
| 2010/0076933 A1 | 3/2010 | Hamilton et al. | |
| 2010/0131948 A1 | 5/2010 | Ferris | |
| 2010/0191868 A1 | 7/2010 | Pappu et al. | |
| 2010/0332401 A1 | 12/2010 | Prahlad et al. | |
| 2010/0333116 A1 | 12/2010 | Prahlad et al. | |
| 2011/0004629 A1* | 1/2011 | Thorat | H04L 41/084 707/783 |
| 2011/0035376 A1 | 2/2011 | Kirshenbaum et al. | |
| 2011/0055712 A1* | 3/2011 | Tung | G06F 9/5072 715/738 |
| 2011/0142064 A1* | 6/2011 | Dubal | H04L 47/122 370/412 |
| 2011/0145392 A1 | 6/2011 | Dawson et al. | |
| 2011/0178831 A1* | 7/2011 | Ravichandran | G06Q 10/06 705/7.11 |
| 2011/0225209 A1 | 9/2011 | Volvovski et al. | |
| 2011/0264748 A1 | 10/2011 | Pouzin et al. | |
| 2013/0205109 A1 | 8/2013 | Benhase et al. | |
| 2013/0346513 A1 | 12/2013 | Jia et al. | |
| 2014/0115335 A1 | 4/2014 | Jorden et al. | |
| 2014/0149517 A1 | 5/2014 | Greinhofer et al. | |

OTHER PUBLICATIONS

"A Dictionary of Computing", Sixth Edition, Oxford University Press, 2008, pp. 1-2, 397.
"Amazon EC2 Developer Guide", Amazon.com, 2006, pp. 1-161.
"Amazon EC2 on Dec. 14, 2009", Amazon Web Services, http://aws.amazon.com/releasenotes/3214, Sep. 16, 2015, pp. 1-3.
"Amazon Elastic Compute Cloud (Amazon EC2)", https://web.archive.org/web/20090115222039/http://aws.amazon.com/ec2, Internet Archive WayBack Machine, Jul. 26, 2015, pp. 1.
"Amazon Elastic Load Balancing Developer Guide", API Version, May 15, 2009, pp. 1-91.
"Announcing Amazon Elastic Mapreduce", https://aws.amazon.com/about-aws/wahts-new/2009/04/02/announcing-amazon-elastic-mapreduce, Sep. 16, 2015, pp. 1-3.
"Auto-Scaling Amazon EC2 With Amazon SQS", Amazon Web Services, https://aws.amazon.com/articles/1464, Sep. 16, 2015, pp. 1-4.
"AWS Solutions", Amazon Web Services, Internet Archive WayBack Machine, https://web.archive.org/web/20081016104952/http://aws.amazon.com/solutions/aws-solutions/, Jul. 26, 2015, pp. 1.
"Cemaphore Systems Launches Mailshadow Online, the First Email Sync Online Service With Real-Time Email Migration, Replication and Recovery", Cemaphore Systems, Business Wire, Apr. 29, 2009, pp. 1-2.
"Cemaphore Systems' New Mailshadow Cloud-Based Email Migration and Continuity Solutions Provide Unmatched Sync Flexibility and Migration Simplicity", Cemaphore Systems, Business Wire, Mar. 23, 2009, pp. 1-2.
"Cemaphore Systems Refreshes Mailshadow Family With Enhancements for Mobile Users and Enterprises", Cemaphore Systems, Business Wire, Feb. 23, 2009, pp. 1-2.
"Cemaphore Systems, A Microsoft Gold Certified Partner, Provides Complete Cloud Computing Solution With Microsoft Business Productivity Online Suite and Mailshadow Online", http://www.reuters.com/article/2009/05/04/idUS73868+04-May-2009+BW20090504; Press Release; Monday, May 4, 2009 6:00 am EDT, pp. 2.
"Cloud Enablement, Simplified", BitTitan; www.bittitan.com; downloaded Jul. 23, 2015, pp. 1-8.
"Elastic Load Balancing—Quick Reference Card", Amazon Web Services, May 15, 2009, pp. 1.
"Mailshadow Onsite", Cemaphore Systems, Internet Archive WayBack Machine; http://web.archive.org/web/20090401224218/http://www.cemaphore.com/mailshadowo.html, Apr. 1, 2009, pp. 1-2.
"Mailshadow Sync Between Google Apps and Outlook Assures Email Freedom, Portability and Business Continuity", Cemaphore Systems, Business Wire, Jun. 11, 2009, pp. 1-2.
"Mailtrust", Amazon Web Services, https://web.archive.org/web/20081202152722/http://aws.amazon.com/solutions/case-studies/mailtrust/, Jul. 26, 2015, pp. 1.
"Migration to Office 365 Allows for Better Communication", BitTitan Blog; http://blog.bittitan.com/2012/07/20/a-successful-migration-to-office-365-allows-for-better-communication-between-international-offices/, Jul. 20, 2012, pp. 1-5.
"One of Seattle's Best Places to Work", Seattle Magazine; http://www.bittitan.com/about; downloaded Jul. 23, 2015, pp. 1-13.
"Release: Amazon EC2 on May 7, 2009", Amazon Web Services, https://aws.amazon.com/releasenotes/Amazon-EC2/2528, May 17, 2009, pp. 1-3.
"What is AWS", Amazon Web Services, https://web.archive.org/web/20090115222039/http://aws.amazon.com/what-is-aws/, Jul. 26, 2015, pp. 1.
"510 Patent Issued After Alice", Timeline of '510 patent; Exhibit A of Declaration of John Black filed on Sep. 17, 2015, pp. 1.
"Answer: Demand for Jury Trial", United States District Court for the Western District of Washington at Seattle, *BitTitan, Inc.*, a Washington corporation, Plaintiff v. *SkyKick, Inc.*, a Delaware corporation, Defendant; filed Jul. 30, 2015, pp. 1-8.
"BPOS Migration Airlift coming to Europe", Blog Post, Mar. 2009, One page.
"Cloud Migrator 365 Price List", https://www.cloudmigrator365.com/customer/pricing/volume-discounts/; downloaded Jul. 24, 2015, pp. 1-2.
"Construction Group Finds Microsoft Solution Better for Business Than Google Apps", Microsoft Customer Solution Customer Solution Case Study; Vinci, PLC; published Feb. 2010, pp. 1-7.
"Data Migration Assistant User Guide Release 6.1(3)", Cisco Systems, Inc., 2008, pp. 1-38.
"Data-Only Email Migrations", https://www.skykick.com/products/data-only-migrations; downloaded May 13, 2015, pp. 1-4.
"Data-Only Email Migrations—Just the email data, with the quality and ease you'd expect from SkyKick", https://www.skykick.com/products/data-only-migrations; downloaded May 13, 2015, pp. 1-4.
"Data-Only Email Migrations: Migrate Just the Mailbox Data"; http://www.skykick.com/migrate/data-only-migration; retrieved Jul. 24, 2015, pp. 1-6.
"Declaration of Case Collard in Support of Plaintiff's Motion for Preliminary Injunction"; United States District Court for the West-

(56) References Cited

OTHER PUBLICATIONS ern District of Washington at Seattle, *BitTitan, Inc.*, a Washington corporation, Plaintiff v. *SkyKick, Inc.*, a Delaware corporation, Defendant; filed Jul. 8, 2015, pp. 1-3.

"Declaration of Case Collard in Support of Plaintiff's Reply Regarding Patent Eligibility Under 35 U.S.C. § 101", United States District Court for the Western District of Washington at Seattle; *BitTitan, Inc.*, as Washington Corporation, Plaintiff v. *SkyKick, Inc.*, a Delaware Corporation, Defendant; filed Oct. 5, 2015, pp. 1-2.

"Declaration of Dr. John Black in Support of Plaintiff's Motion for Preliminary Injunction", United States District Court for the Western District of Washington at Seattle, *BitTitan, Inc.*, a Washington corporation, Plaintiff v. *SkyKick, Inc.*, a Delaware corporation, Defendant; filed Jul. 8, 2015, pp. 1-6.

"Declaration of Dr. Kristin L. Terris in Support of Plaintiff's Motion for Preliminary Injunction", United States District Court for the Western District of Washington at Seattle, *BitTitan, Inc.*, a Washington corporation, Plaintiff v. *SkyKick, Inc.*, a Delaware corporation, Defendant; filed Jul. 8, 2015, pp. 1-14.

"Declaration of Geeman Yip in Support of Plaintiff's Motion for Preliminary Injunction", United States District Court for the Western District of Washington at Seattle, *BitTitan, Inc.*, a Washington corporation; Plaintiff v. *SkyKick; Inc.*, a Delaware corporation; Defendant; filed Jul. 8, 2015, pp. 1-5.

"Declaration of James L. Davis, Jr. in Support of SkyKick, Inc.'s Response to BitTitan's Memorandum of Law Regarding Patent Eligibility Under §101", United States District Court Western District of Washington at Seattle, *BitTitan, Inc.*, Plaintiff v. *SkyKick, Inc.*, Defendant; filed Sep. 28, 2015, pp. 1-9.

"Declaration of James L. Davis, Jr. in Support of SkyKick, Inc's Opposition to BitTitan's Motion for a Preliminary Injunction", United States District Court Western District of Washington at Seattle; *BitTitan, Inc.*, Plaintiff v. *SkyKick, Inc.*, Defendant; filed Jul. 27, 2015, pp. 1-10.

"Declaration of John Black Regarding Patent Eligibility Under 35 U.S.C. § 101", United States District Court for the Western District of Washington at Seattle, *BitTitan, Inc.*, a Washington corporation, Plaintiff v. *SkyKick, Inc.*, a Delaware corporation, Defendant; filed Sep. 17, 2015, pp. 1-11.

"Declaration of Sandeep Chatterjee, Ph.D (Redacted)", United States District Court for the Western District of Washington at Seattle; *BitTitan, Inc.*, a Washington Corporation, Plaintiff vs. *SkyKick, Inc.*, a Delaware Corporation, Defendant; filed Jul. 27, 2015, pp. 1-63.

"Declaration of Sandeep Chatterjee, Ph.D. in Support of SkyKick's Response to BitTitan's Memorandum of Law Regarding Patent Eligibility Under §101", United States District Court for the Western District of Washington at Seattle, *BitTitan, Inc.*, a Washington Corporation, Plaintiff vs. *SkyKick, Inc.*, a Delaware Corporation, Defendant; filed Sep. 28, 2015, pp. 1-47.

"Enterprise Migration Suite, a Robust Alternative to Hybrid Migrations: Plan, Move, Set-Up and Manage 250+ Sea Cutover or Staged Migrations", https://www.skykick.com/migrate/enterprise-migration, 2015, pp. 1-7.

"Enterprise Migrations Made Easy", https://www.skykick.com/products/enterprise-migrations; downloaded May 13, 2015, pp. 1-6.

"Exchanges for Grid and Cloud Computing", www.britishpublishers.com; based on a project by Dirk Neumann and Jorn Altmann entitled "SORMA—Self-Organising ICT Resource Management", 2009, pp. 1-3.

"Exhibit A to the Declaration of Sandeep Chatterjee, Ph.D.", filed Sep. 28, 2015, pp. 1-6.

"Exhibit B to the Declaration of Sandeep Chatterjee, Ph.D.", filed Sep. 28, 2015, pp. 1-60.

"Exhibit D to the Supplemental Declaration of J. Black", Email exchange between G. Yip (BitTitan, Inc.) and L. Quesada (Amazon); Dec. 23, 2009-Dec. 27, 2009, pp. 1-2.

"Grid Computing—Making the Global Infrastruture a Reality", Wiley Series in Communications Networking & Distributed Systems; edits by F. Berman, G. Fox and A. Hey; copyright 2003, pp. 1-8.

"IEEE 100—The Authoritative Dictionary of IEEE Standard Terms", Seventh Edition, Published by Standards Information Network, IEEE Press; publisehd Dec. 2000, pp. 1-3.

"Internet Solutions Division Strategy for Cloud Computing", Compaq Computer Corporation, CST Presentation, Nov. 14, 1996, pp. 1-4.

"Introducing the Skykick Application Suite—A New Way to Migrate to the Cloud", The SkyKick Blog; https://www.skykick.com/partners/blogs/skykick-blogs/april-2013/introducing-the-skykick-application-suite; Apr. 2013, pp. 1-3.

"Introducing YippieMove '09", http://www.playingwithwire.com/2008/10/yippiemovenowoffersvolumediscountandcustommigration/index.html; Oct. 2008, pp. 1-3.

"Introducing YippieMove '09", Playing With Wire the Internet Startup Blog; http://www.playingwithwire.com/2008/09/; posted Sep. 28, 2008, pp. 1-3.

"Introducing YippieMove '09—YippieMove Migrates Workers United's Email Over Night", RSS, Playing With Wire the Internet Startup Blog; http://playingwithwire.com/2009/04/yippiemove-migrates-workers-uniteds-email-over-night/index-html; Apr. 2009, pp. 1-3.

"Introducing YippieMove '09—YippieMove Now Offers Volume Discounts and Custom Migration", RSS; Playing With Wire the Internet Startup Blog; http://www.playingwithwire.com/2008/10/yippiemove-now-offers-volume-discount-and-custom-migration/index.html; Oct. 2008, pp. 1-3.

"Introducing YippieMove '09: Delayed Switch to the New Infrastructure", RSS, Playing With Wire the Internet Startup Blog; http://www.playingwithwire.com/2009/05/delayed-switch-to-the-new-infrastructure/index.html; May 2009, pp. 1-3.

"IUR Skykick Migration Offer", https://www.skykick.com/iur; Exhibit I of Declaration of Case Collard filed on Jul. 8, 2015, pp. 1-2.

Jul. 2015 Update Appendix 1: Examples, Jul. 2015; pp. 1-22.

"Mail and Data Migration Price Per User", Migration Price List; Cloudiway; http://cloudiway.com/price-list/, pp. 1-3.

"Mailshadow 2.2 for Exchange Migration Datasheet", Cemaphore Systems, https://web.archive.org/web/20081227000255/; http://www.cemaphore.com/downloads/cemaphore-migration-datasheet.pdf.; Dec. 27, 2008, pp. 1-2.

"Microsoft Computer Dictionary", Fifth Edition; Published by Microsoft Press, a Division of Microsoft; copyright 2002, pp. 1-3.

"Microsoft Pinpoint—BitTitan, Kirkland, Washington USA (HQ)", https://pinpoint.microsoft.com/en-OM/Companies/4297151790; downloaded Jul. 22, 2015, pp. 1.

"Microsoft Pinpoint Search Results 'Cloud Email Migration'", https://pinpoint.microsoft.com/en-US/search?type=companies&keyword=cloud+email+migration&page=0; downloaded Jul. 23, 2015, pp. 1-4

"Microsoft Pinpoint: SkyKick, Seattle, Washington, USA (HQ)", https://pinpoint.microsoft.com/en-US/Companies/4298392373; downloaded Jul. 22, 2015, pp. 1.

"Migrate to Office 365 With Cloudmigrator 365", https://www.cloudmigrator365.com/customer/platforms/; downloaded Jul. 24, 2015, pp. 1-2.

"Migrating to Office 365: Pitfalls to Avoid", BitTitan Blog; https://blog.bittitan.com/2011/06/10/getting-to-office-365-migration-pitfalls/; Oct. 6, 2011, pp. 1-4.

"Migration Suites, Automation for Predictable, Seamless and Stress-Free Office 365 Migrations", http://www.skykick.com/migrate; retrieved Jul. 24, 2015, pp. 1-27.

"Migrationwiz is a Secure, Quick, Low Cost, Self-Service Mailbox Migration Solution to Exchange Online", Microsoft Online Services; published Feb. 2009, pp. 1-5.

"Migrationwiz Performed the Largest Gmail Migration in Europe to Microsoft Exchange", BitTitan Blog (case studies); https://blog.bittitan.com/2010/02/025/migrationwiz-performed-the-largest-gmail-migration-in-Europe-to-Microsoft-exchange/; Feb. 25, 2010, pp. 1-4.

(56) References Cited

OTHER PUBLICATIONS

"Migrationwiz Screenshot", www.migrationwiz.com/secure/mailbox, screenshot from a demonstration of Migration Wiz (May 2009); full video available at: https://channel9.msdn.com/Events/TechEd/NorthAmerica/2009/UNC310, May 2009, pp. 1.
"Moving the Mail", United States Postal Service; https://about.usps.com/who-we-are/postal-history/moving-mail.htm; downloaded Sep. 27, 2015, pp. 1-41.
"Office 365 to Office 365 Migrations", BitTitan Blog; Jan. 12, 2011; https://blog.bittitan.com/2011/12/01/office-365-to-office-365-migrations/, pp. 1-5.
"Order Denying Motion for Preliminary Injunction", United States District Court Western District of Washington at Seattle, *BitTitan, Inc.*, a Washington corporation, Plaintiff v. *SkyKick, Inc.*, a Delaware corporation, Defendant; issued Aug. 27, 2015, pp. 1-16.
"Order Granting Motion to Voluntarily Dismiss Appeal", United States District Court for the Western District of Washington at Seattle, *BitTitan, Inc.*, a Washington corporation, Plaintiff v. *SkyKick, Inc.*, a Delaware corporation, Defendant; ordered Oct. 15, 2015, pp. 1.
"Plaintiff's Motion for Preliminary Injunction", United States District Court for the Western District of Washington at Seattle, *BitTitan, Inc.*, a Washington corporation, Plaintiff v. *SkyKick, Inc.*, a Delaware corporation, Defendant.; filed Jul. 8, 2015, pp. 1-24.
"Plaintiff's Memorandum of Law Regarding Patent Eligibility Under 35 U.S.C. 101", United States District Court for the Western District of Washington in Seattle, *BitTitan, Inc.*, a Washington corporation, Plaintiff v. *SkyKick, Inc.*, a Delaware corporation, Defendant; filed Sep. 17, 2015, pp. 1-17.
"Plaintiff's Motion to Voluntarily Dismiss Appeal", United States District Court for the Western District of Washington at Seattle, *BitTitan, Inc.*, a Washington corporation, Plaintiff v. *SkyKick, Inc.*, a Delaware corporation, Defendant; filed Oct. 13, 2015, pp. 1-2.
"Plaintiff's Reply in Support of Motion for Preliminary Injunction", United States District Court for the Western District of Washington at Seattle, *BitTitan, Inc.*, a Washington corporation, Plaintiff v. *SkyKick, Inc.*, a Delaware Corporation, Defendant; filed Jul. 31, 2015, pp. 1-18.
"Plaintiff's Reply Regarding Patent Eligibility Under 35 U.S.C. § 101", United States District Court for the Western District of Washington at Seattle, *BitTitan, Inc.*, a Washington corporation, Plaintiff v. *SkyKick, Inc.*, a Delaware corporation, Defendant; filed Oct. 5, 2015, pp. 1-8.
"Product Comparison Summary", https://www.skykick.com/products/compare-skykick-migrations; downloaded May 13, 2015, pp. 1-3.
"Quest Move Mailbox Manager", Quest Software.com; Internet Archive WayBack Machine; downloaded Jul. 25, 2015, pp. 1.
"Quest Move Mailbox Manager—Features & Benefits", Quest Software; Internet Archive WayBack Machine; https://web.archive.org/web/20050319032038/http://wm.quest.com/products/MoveMailboxManager/features_and_benefits.asp; downloaded Jul. 25, 2015, pp. 1.
"Report of the Filing or Determination of an Action Regarding a Patent or Trademark", U.S. District Court Western District of Washington, *BitTitan, Inc.*, a Washington corporation (Plaintiff) and *SkyKick, Inc.*, a Delaware corporation (Defendant); dated May 15, 2015; pp. 1.
"Report on the Filing or Determination of an Action Regarding a Patent or Trademark", U.S. District Court Western District of Washington, *BitTitan, Inc.*, a Washington corporation (Plaintiff), *SkyKick, Inc.*, a Delaware corporation; filed May 14, 2015, pp. 1.
"RSYNC(1)—Linux Man Page", http://linux.die.net/man/1/rsync; downloaded Jul. 26, 2015, pp. 1-49.
"SkyKick Creates New Way to Migrate SMBs to Cloud; Launches Application Suite to Help Microsoft Partners Move Customers to Office 365", https://www.skykick.com/press; posted Apr. 22, 2013, pp. 1-2.
"SkyKick Launches Data-Only Migration Application", SkyKick, Posted Nov. 18, 2014, pp. 1.
"SkyKick Launches Enterprise Migration Suite; Provides New Way to Move Enterprises to Microsoft Office 365", SkyKick; Posted May 20, 2014, pp. 1-2.
"SkyKick Launches New Cloud Management Category, Secures Additional $10 Million in Funding", SkyKick, https://www.skykick.com/about/press/2015/skykick-launches-new-cloud-management-category-secures-additional-$10-million-in-funding; Jun. 30, 2015, pp. 1-3.
"SkyKick Named One of Washington's Best Companies to Work for in 2015", SkyKick, http://www.skykick.com/about/press/2015/skykick-named-one-of-washingtons-best-companies; Jul. 21, 2015, pp. 1-3.
"SkyKick Wins Red Herring Top 100 Award", SkyKick Press Area; https://www.skykick.com/press; Posted Jun. 5, 2015;, pp. 1-2.
"SkyKick, Inc.'s Opposition to BitTitan's Motion for a Preliminary Injunction (Public Version)", United States District Court Western District of Washington at Seattle, *BitTitan, Inc.*, Plaintiff v. *SkyKick, Inc.*, Defendant; filed Jul. 27, 2015, pp. 1-31.
"SkyKick's Response to BitTitan's Memorandum of Law Regarding Patent Eligibility Under § 101", United States District Court Western District of Washington at Seattle, *BitTitan, Inc.*, Plaintiff, v. *SkyKick, Inc.*, Defendant; filed Sep. 28, 2015, pp. 1-18.
"Small Business Migration Suite", http://www.skykick.com/migrate/smb-migration; retrieved Jul. 24, 2015, pp. 1-8.
"SMB Migration Suite", https://www.skykick.com/products/small-business-migrations; downloaded May 13, 2015, pp. 1-4.
"SORMA—Self-Organizing ICT Resource Management", http://www.sorma-project.org/; retrieved Sep. 16, 2015, pp. 1-2.
"Step 1: Where Are we Moving From?", YippieMove, "The world's easiest email transfer tool"—Screenshot of video at 0:41 (Oct. 21, 2008). The video is available and can be viewed at https://www.youtube.com/watch?v=RVRnclKp001, Oct. 21, 2008, pp. 1.
"Stipulated Order of Dismissal", United States District Court for the Western District of Washington at Seattle, *BitTitan, Inc.*, Plaintiff v. *SkyKick, Inc.*, Defendant; dated Oct. 13, 2015, pp. 1-3.
"Supplemental Declaration of Case Collard in Support of Plaintiff's Motion for Preliminary Injunction", United States District Court for the Western District of Washington at Seattle, *BitTitan, Inc.*, a Washington corporation, Plaintiff v. *SkyKick. Inc.*, a Delaware corporation, defendant; filed Jul. 31, 2015, pp. 1-2.
"Supplemental Declaration of John Black Regarding Patent Eligibility Under 35 U.S.C. §101", United States District Court for the Western District of Washington at Seattle, *BitTitan, Inc.*, a Washington corporation, Plaintiff v. *SkyKick, Inc.*, a Delaware corporation, Defendant; filed Oct. 5, 2015, pp. 1-21.
"The Revised Language of Independent Claim 1", Exhibit C, filed Sep. 17, 2015, pp. 2.
"The World's Easiest Email Transfer Tool", https://www.youtube.com/watch?v=RVRnclKp00l; retrieved Sep. 27, 2015, pp. 1-2.
"The World's Easiest Email Transfer Tool—Screenshot", YouTube; uploaded Oct. 21, 2008, pp. 1.
"Videotaped Deposition of John R. Black, Jr., Ph.D.", In the United States District Court for the Western District of Washington at Seattle, *BitTitan, Inc.*, a Washington corporation, Plaintiff v. *SkyKick, Inc.*, a Delaware corporation, Defendant; Sep. 25, 2015, pp. 1-39.
"Videotaped Deposition of: Sandeep Chatterjee, Ph.D.", United States District Court Western District of Washington at Seattle; *BitTitan, Inc.*, a Washington Corporation, Plaintiff v. *SkyKick, Inc.*, a Delaware corporation, Defendant, Oct. 2, 2015, pp. 1-63.
"Virtualization Overview", VMware White Paper; copyright 2006, pp. 1-11.
"VMware Distributed Resource Scheduler (DRS)—Dynamic Load Balancing and Resource Allocation for Virtual Machines", VMware DRS, Product Datasheet; copyright 2009, pp. 1-3.
"VMware Virtualcenter—Centralized Management, Automation and Optimization for IT Infrastructure", VMware Product Datasheet; copyright 1998-2007, pp. 1-3.
"Webster's New College Dictionary", Third Edition, Houghton Mifflin Harcourt; copyright 2008, 1-2, pp. 900.
"Welcome to the MigrationWiz Blog", Blog Post, Apr. 2009, One page.

(56) References Cited

OTHER PUBLICATIONS

"Why YippieMove", https://www.yippiemove.com/; downloaded Jul. 29, 2015, pp. 1-2.
"YippeeMove Help-What is YippeeMove?", https://web.archive.org/web/20090404124613/http:/www.yippiemove.com/help.html#batch; downloaded Jul. 14, 2015, 1.
"YippeeMove Now Offers Volume Discount and Custom Migration", Playing With Wire the Internet Startup Blog; http://www.playingwithwire.com/2008/10/yippiemovenowoffersvolumediscountandcustomermigration/index.html, 2008, pp. 1-3.
"YippeeMove—Email Transfers Made Easy", Internet Archive WayBack Machine; https://web.archive.org/web/20090410191724/http:/www.yippiemove.com/index.html; downloaded Jul. 14, 2015, pp. 1.
"YippeeMove—Migrate Your Email", Internet Archive WayBack Machine; downloaded Jul. 26, 2015; https://web.archive.org/web/20080724022235/http://www.yippiemove.com/;, pp. 1.
"YippeeMove About: Migrate Your Email in Style", https://web.archive.org/web/20080831184539/http://www.yippiemove.com/about.html; retrieved Jul. 26, 2015, pp. 1.
Anderson, David et al., ""Migration to Microsoft Online Services From Exchange and Non-Microsoft Platforms"", UNC310; https://channel9.msdn.com/Events/TechEd/NorthAmerica/2009/UNC310, 2009, pp. 1-4.
Barr, Jeff, New Features for Amazon EC2: Elastic Load Balancing, Auto Scaling, and Amazon Cloudwatch, AWS Official Blog, posted May 18, 2009; https://aws.amazon.com/blogs/aws/news-aws-load-balancing-automatic-scaling-and-cloud-monitoring-services/, pp. 1-7.
Barr, Jeff , ""Big Day for Amazon EC2: Production, SLA, Windows, and 4 New Capabilities"", AWS Official Blog, http://aws.amazon.com/blogs/aws/big-day-for-ec2, Oct. 23, 2008, pp. 1-6.
Bekker, Scott , "Partner: Tool Targets 3 Problems With Large Migrations to Office 365", Bekker's Blog, Redmond Channel Partner, Jul. 24, 2015, pp. 1-5.
Bekker, Scott , "Third-Party Tools for Office 365 Migration and Management", Redmond Channel Partner Online; https://rcpmag.com/Articles/2014/06/01/Power-Tools-For-Office-365.aspx?p=1; Jun. 9, 2014, pp. 1-5.
Bigelow, Stephen J. , ""Choose the Right Office 365 Migration Tool"", http:/searchexchange.techtarget.com/feature/Choose-the-right-Office-365-migration-tool, Nov. 2014, pp. 1-4.
Black, John , "SkyKicks Infringement of U.S. Pat. No. 8,938,510 Claims 1, 2, and 7", Exhibit A to Declaration of Dr. John Black; filed Jul. 8, 2015, pp. 1-8.
Buyya, Rajkumar , "Market-Oriented Cloud Computing: A Vision, Hype, and Reality of Delivering Computing as the 5th Utility", The Gridbus Project, The University of Melbourne, May 18, 2009, pp. 1-62.
Buyya, Rajkumar et al,, "Market-Oriented Cloud Computing: Vision, Hype, and Reality for Delivering IT Services as Computing Utilities", Grid Computing and Distributed Systems (GRIDS) Laboratory, Department of Computer Science and Software Engineering, The University of Melbourne, Australia; Jul. 18, 2008, pp. 1-11.
Cardellini, Valeria et al., "Dynamic Load Balancing on Web-Server Systems", IEEE Internet Computing, vol. 3, No. 3, May-Jun. 1999, pp. 1-24.
Dasgupta, Koustuv et al., "QoSMig: Adaptice Rate-Controlled Migration of Bulk Data in Storage Systems", Data Engineering, 2005. ICDE 2005. Proceedings. 21st International Conference on, Apr. 5-8, 2005, pp. 816-827.
Doninger, Cheryl et al., ""Balancing the Load—SAS Service Technologies for Scalability"", SAS Global Forum 2008, Systems Architecture, 2008, pp. 1-13.
Doninger, Cheryl et al., "SAS Goes Grid—Managing the Workload Across Your Enterprise", SUGI 31, Systems Architecture, Paper 211-31; SUGI 31 Proceedings, San Francisco, California, Mar. 26-29, 2006, pp. 1-32.
Dornemann, Tim et al., "On-Demand Resource Provisioning for BPEL Workflows Using Amazon's Elastic Compute Cloud", CCGRID '09 Proceedings of the 2009 9th IEEE/ACM International Symposium on Cluster Computing and the Grid; 2009, pp. 1-10.
Foster, Ian et al., "The Grid: Blueprint for a New Computing Infrastructure", Second Edition; The Elsevier Series in Grid Computing; copyright 2004, pp. 1-48.
Foster, Ian , "What is the Grid? A Three Point Checklist", Argonne National Laboratory & University of Chicago; Jul. 20, 2002, pp. 1-4.
Fujiwara, Ikki et al., "Market-Based Resource Allocation for Distributed Computing", IPSJ SIG Technical Report, 2009 Information Processing Society of Japan, pp. 1-6.
Gite, Vivek , "Move of Migrate User Accounts From Old Linux Server to a New Linux Service", Published Dec. 13, 2006; http://www.cyberciti.biz/faq/howto-move-migrate-user-accounts-old-to-new-server/, pp. 1-20.
Goyal, Brajesh , "Oracle Data Base 10G: The Database for the Grid", An Oracle White Paper, Nov. 2003, pp. 1-18.
Greene, Tim , "Avoid the Gotchas of Office 365 Migrations", Network World, Jun. 30, 2014, pp. 1-3.
Karagiannis, Thomas , "Hermes: Clustering Users in Large-Scale E-mail Services", SoCC'10, Jun. 10-11, 2010, pp. 1-12.
Lu, Chenyang et al., "Aqueduct: online data migration with performance guarantees", Conference on File and Storage Technologies (FAST'02), Jan. 28-30, 2002, pp. 219-230.
Lynch, C. G. , ""Microsoft Further Enhances Cloud Computing With Online Sharepoint, Exchange"", CIO; CIO.com, Nov. 17, 2008, pp. 1-4.
MacVittie, Don , "Intro to Load Balancing for Developers—The Algorithms", F5 Networks, Inc.; www.f5.com, Mar. 31, 2009, pp. 1-3.
McCorry, Kieran , "Microsoft Exchange 2003 Deployment & Migration", Elsevier Digital Press; copyright 2004, pp. ALL.
McLaughlin, Kevin , "Microsoft to Provide Free Onboard Services to Enterprise Mobility Suite Customers", CRN News, Analysis, and Perspective for Vars and Technology Integrators; The Channel Company; http://www.crn.com/news/cloud/300077366/Microsoft-to-provide-free-onboarding-services-to-enterprise-mobility-suite-customers.htm, Jul. 7, 2015, pp. 1-2.
McLaughlin, Kevin , "Parnters Baffled by Microsoft's Mixed Messages on Free Office 365 Migrations Program", CRN New, Analysis, and Perspective for Vars and Technology Integrators; The Channel Company; http://www.crn.com/new/cloud/300073596/partners-baffled-by-microsofts-mixed-messages-on-free-office-365-migrations-program.htm, Aug. 4, 2014, pp. 1-2.
Mohamed, Arif , "A History of Cloud Computing", ComputerWeekly.com; http://www.computerweekly.com/feature/A-history-of-cloud-computing?vgnextfmt=print, Mar. 27, 2009, pp. 1-2.
Motal, Julius , "Microsoft Office 365 Launching Jun. 28", PCMag.com; Jun. 6, 2011, pp. 1-4.
Nabrzyski, Jarek et al., "Grid Resource Management : State of the Art and Future Trends", Kluwer Academic Publishers; http://www.cs.mcgill.ca/~maheswar/COURSES/ANC2004/PAPERS/RMS_book.pdf.; 2004, pp. 1-86.
Petersson, Viktor , "Misericordia University Completes Successful Email Migration With YippieMove", Wireload; http://wireload.net/news/2009/11/misericordia_university_completes_successful_email_migration_with_yippiemove.html; published Nov. 24, 2009, pp. 1-2.
Petersson, Viktor , "YippieMove Now Supports Office 365", Wireload, http://wireload.net/news/2011/12/yippiemove_now_supports_office_365.html; Dec. 8, 2011, pp. 1-2.
Pick, Gershon, "Data Migration Concepts & Challenges", Retrieved Feb. 26 from http://www._aymgael._com/pdf%_20reports/Data%20Migration%_20Concepts%_20&%_20Challenges. pdf, 2001, pp. 1-15.
Pouzin, Dominic J. et al., "On-Demand Mailbox Synchronization and Migration System", U.S. Appl. No. 61/328,003, filed Apr. 26, 2010, pp. 1-29.

(56) References Cited

OTHER PUBLICATIONS

Ranjan, S et al., "QoS-Driven Server Migration for Internet Data Centers", Quality of Service, 2002. Tenth IEEE International Workshop on, 2002, pp. 3-12.
Regalado, Antonio , "Who Coined 'Cloud Computing'?", MIT Technology Review; Oct. 31, 2011, pp. 1-2.
Rubens, Paul , ""Microsoft Office 365 Adoption Takes Off, War With Google Apps Rages On"", CIO New Analysis, Jan. 22, 2015, pp. 1-4.
Sachs, Robert R., "Theone Year Anniversary: The Aftermarth of #ALICESTORM", Bilski Blog, The Fenwick & West Bilski Blog; http://www.bilskiblog.com/blog/2015/06/the-one-year-anniversary-the-aftermath-of-alicestorm.html, Jun. 20, 2015, pp. 1-11.
Song, Biao et al., ""A Novel Cloud Market Infrastucture for Trading Service"", Internet Computing and Network Security Lab, Department of Computer Engineering, Kyung Hee University, Global Campus, South Korea; 2009 International Conference on Computational Science and its Applications, 2009, pp. 1-7.
Stacey, Craig et al., "The Water Fountain vs. The Fire Hose: An Examination and Comparison of Two Large Enterprise Mail Service Migrations", LISA '09: 23rd Large Installation System Administration Conference, Nov. 1-6, 2009, 29-46.
Stage, Alexander et al., "Network-aware migration and scheduling of differentiated virtual machine workloads", ICSE'09 Workshop (CLOUD'09), May 23, 2009, pp. 1-6.
Stanojevic, Rade et al., "Load Balancing Vs. Distributed Rate Limiting: An Unifying Framework for Cloud Control", Hamilton Institute, NUIM, Ireland; IEEE International Conference on Communications; Jun. 14-18, 2009.
Strodl, Stephan et al., "Automating Logical Preservation for Small Institutions with Hoppla", M. Lalmas et al. (Eds.): ECDL 2010, LNCS 6273, 2010, pp. 124-135.
Talbot, Chris , "SkyKick Gives Office 365 Partners Tools for SMB Customers", Talkin Cloud, Apr. 25, 2013; http://talkincloud.com/cloud-computing-management/skykick-gives-office-365-partners-migration-tools-smb-customers, pp. 1.
Tungare, Manas et al., "Syncables: A Framework to Support Seamless Data Migration Across Multiple Platforms", Portable Information Devices, 2007. PORTABLE07. IEEE International Conference on, May 25-29, 2007, pp. 1-5.
Varia, Jinesh , "Cloud Architectures", Amazon Web Services, Jun. 2008, pp. 1-14.
Vogels, Werner , "All Things Distributed", Werner Vogel's weblog on building scalable and robust distributed systems; http://www.allthingsdistributed.com/2009/05/amazon_cloudwatch.html; May 17, 2009, pp. 1-3.
Von Eicken, Thorsten , "Amazon Adds Load Balancing, Monitoring, and Autoscaling", Cloud Management Blog; posted May 18, 2009; http://www.rightscale.com/blog/cloud-industry-insights/amazon-adds-load-balancing-monitoring-and-autoscaling, pp. 1-12.
Walsh, Larry , "SkyKick Aims for Enterprise Office 365 Migrations", Channel Business, May 20, 2014; http://www.channelnomics.com/channelnomics-use/news/2370028/skykick-aims-for-enterprise-office-365-migrations, pp. 1-8.
Work, Henry , "SCALR: The Auto-Scaling Open-Source Amazon EC2 Effort", TechCrunch, posted Apr. 3, 2008; http://techcrunch.com/2008/04/03/scalr-the-auto-scaling-open-source-amazon-ec2-effort/, pp. 1-6.
Yin, Li et al., "SmartMig: Risk-Modulated Proactive Data Migration for Maximizing Storage System Utility", Proc. of IEEE MSST, 2006, pp. 1-13.
You, Xindong et al., "RAS-M: Resource Allocation Strategy Based on Market Mechanism in Cloud Computing", 2009 Fourth ChinaGrid Annual Conference; IEEE Computer Society; downloaded Dec. 3, 2009 from IEEE Xplore, pp. 1-8.
"Cloudiway Emails Migration", http://www.cloudiway.com/products/cloudiway-emails-migration/; retrieved Jul. 24, 2015; pp. 1-6.
"Exchange 2003 to Exchange 2007 Migration", Cemaphore Systems, Internet Archive WayBack Machine; https://web.archive/20090410184759/http://www.cemaphore.com/blog/, Apr. 10, 2009, pp. 1-5.
"Exchange Migration", Cemaphore Systems; Internet Archive WayBack Machine; http://web.archive.org/web/20090401224213/http://www.cemaphore.com/exchange-migration.html, Apr. 1, 2009, pp. 1-2.
"Amazon Web Services Launches Amazon Elastic Mapreduce—A Web Service for Processing Vast Amounts of Data", Amazon.com Investor Relations Press Release, Amazon; downloaded Sep. 16, 2015, pp. 1-3.
"Codetwo Office 365 Migration—Prices", http://www.codetwo.com/office-365-migration/pricing; retrieved Jul. 24, 2015, pp. 1-2.
"Supplemental Declaration of Dr. John Black in Support of Plaintiff's Motion for Preliminary Injunction (Public Version)", United States District Court for the Western District of Washington at Seattle; *BitTitan, Inc.*, a Washington corporation, Plaintiff v. *SkyKick, Inc.*, a Delaware corporation, Defendant; filed Jul. 31, 2015, pp. 1-3.
"Tar File Info", Tar, Release 1.11.8, Info Pages, available at http://ftp.gnu.org/gnu/tar/; Exhibit 4 of the Declaration of James L. Davis filed Jul. 27, 2015, pp. 1-144.
Bose, Rohan et al., "Migrating SMB Customers to Office 365: How Channel Partners Can Leverage Migration Tools to Win in the Cloud", AMI White Paper; published May 2015, pp. 1-12.
Liu, Liang et al., "IBM Research Report: Automatic Model-Based Service Hosting Environment Migration", RC24436 (C0711-044), Nov. 27, 2007, pp. 1-5.
Tsidulko, Joseph , ""Riled Partners: Microsoft, With Fasttrack Migrations, Will be Our Competitor"", CRN News, Analysis, and Perspective for Vars and Technology Integrators; The Channel Company; http://www.crn.com/new/cloud.300077416/riled-partners-Microsoft-with-fasttrack-migrations-will-be-our-competitor.htm?itc=refresh, Jul. 10, 2015, pp. 1-6.

\* cited by examiner

ON-DEMAND MAILBOX SYNCHRONIZATION AND MIGRATION SYSTEM

CROSS-REFERENCE TO RELATED APPLICATION(S)

This application is a continuation of U.S. patent application Ser. No. 12/961,268, filed Dec. 6, 2010, and issued as U.S. Pat. No. 8,938,510 on Jan. 20, 2015, which application claims priority to U.S. Provisional Application No. 61/328,003, filed Apr. 26, 2010. The aforementioned applications are incorporated herein by reference, in their entirety, for any purpose.

FIELD OF THE INVENTION

The invention is generally directed to electronic messaging systems, and more particularly, bi-directional synchronization and uni-directional migration of messaging system content between a source messaging system and a destination messaging system e.g., e-mails, instant messages, texts, chats, contacts, tasks, appointments, and the like.

BACKGROUND

Conventional synchronization or migration of mailbox accounts between source and destination messaging systems, often employs specialized software that is installed on a pre-defined set of computing resources, each connected to one or more networks. As a result, the available networking and computing resources for synchronization and/or migration is limited to the installation base. Often, relatively cumbersome capacity planning is required to determine the adequate number and location of computing resources to ensure timely synchronization or migration.

Because computing resource requirements often change, over or under utilization of these resources can be an issue. For example, as a migration progresses, resource requirements may decrease with the amount of mailbox content left to migrate. Conversely, resource requirements may increase as new migrations are requested. Because conventional systems do not dynamically adapt to changing resource requirements, cumbersome manual intervention may be required to deploy new computers and increase capacity, or free assigned computers and reclaim unused resources.

Further, depending on the number and size of mailbox accounts to process, synchronization or migration may require large amounts of information to be transmitted between source and destination messaging systems. Because of limited networking resources, conventional systems may experience issues such as limited bandwidth, throttled connections, or blocked IP addresses, resulting in slow or failed synchronizations or migrations.

Further, synchronization or migration may require large amounts of computing resources for processor intensive activities such as authenticating connections or converting, analyzing, or indexing mailbox account content. Because of limited computing resources, conventional systems may experience issues such as insufficient processing capacity, resulting in slow or failed synchronizations or migrations.

Further, synchronization or migration may require access to a large number of credentials to connect to a plurality of mailbox accounts. This is particularly true when a messaging system does not support administrative access to all mailboxes, or administrative credentials are unknown, and only a potentially large number of individual users have knowledge of authentication credentials.

DETAILED DESCRIPTION

The invention is a system for dynamically managing physical and logical resources to provide on-demand synchronization or migration of mailbox accounts and their corresponding content. Physical resources are managed by automatically assigning mailbox processing tasks to either reserved computing resources, or computing resources dynamically obtained from cloud computing services. Authentication resources are managed by automatically requesting credentials from users, accepting submitted credentials, and initiating mailbox processing tasks.

Figure 1A:
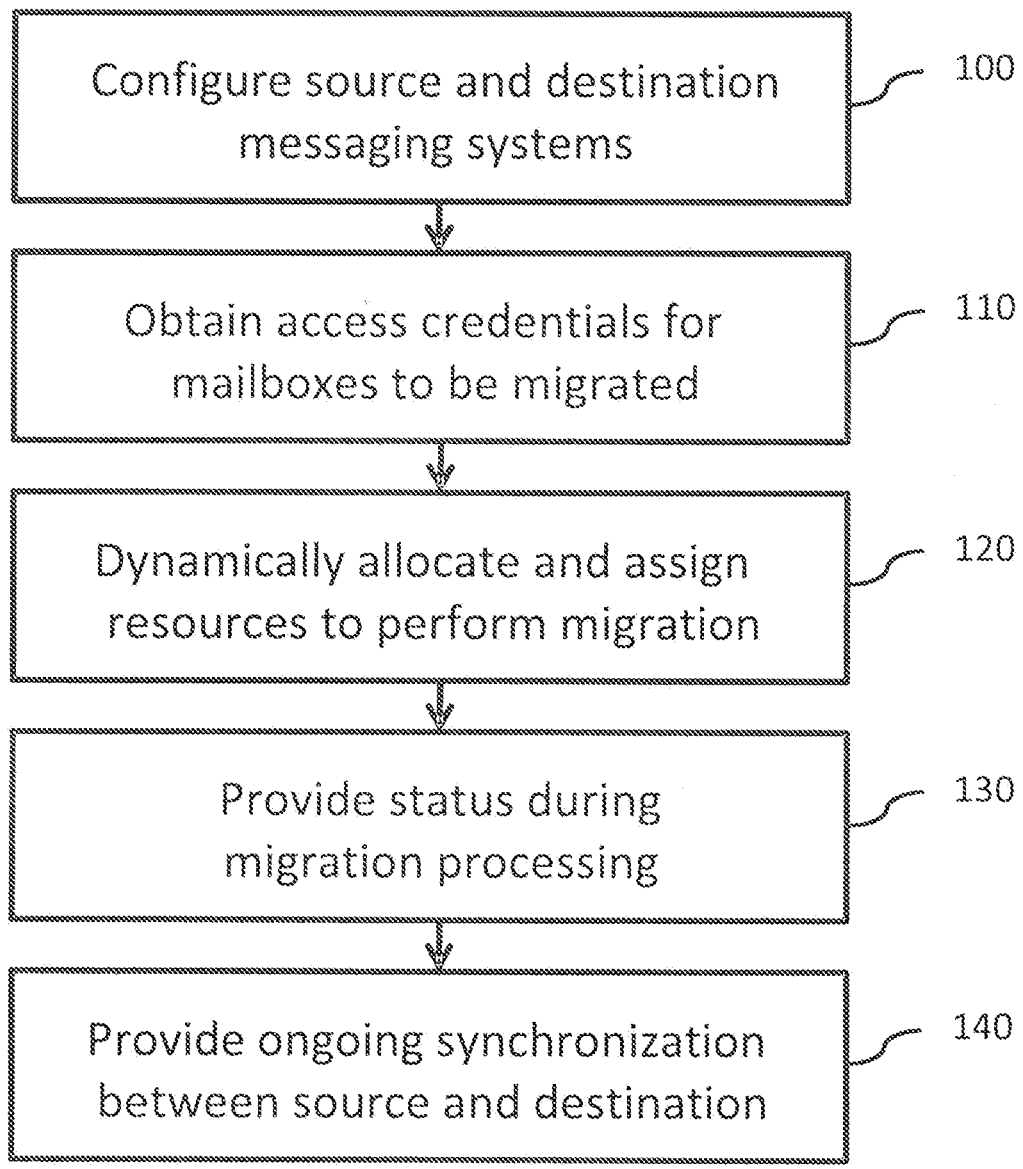
FIG. 1A illustrates an overview of a flowchart for providing on-demand mailbox account migration from a source messaging system to a destination messaging system.

Turning to FIG. 1A, a high-level overview of the steps used to provide on-demand migration is shown. At step 100, the source and destination messaging systems are configured. During configuration, information about server location, access credentials, a list of mailboxes to process, and additional processing options may be provided. At step 110, access credentials are obtained by automatically requesting credentials from individual mailbox users. This step is not required if administrative access to user mailboxes is available, or if mailbox credentials were already specified during configuration. At step 120, mailbox migration processing tasks are assigned to computing resources. If computing resources are insufficient or unavailable, new computing resources are dynamically allocated. At step 130, status information is provided during mailbox migration processing. Status information allows authorized users to monitor mailbox migrations, but also provides information about the availability of, and workload associated with each computing resource. At step 140, ongoing synchronization between source and destination messaging systems may be provided as an option.

Figure 1B:
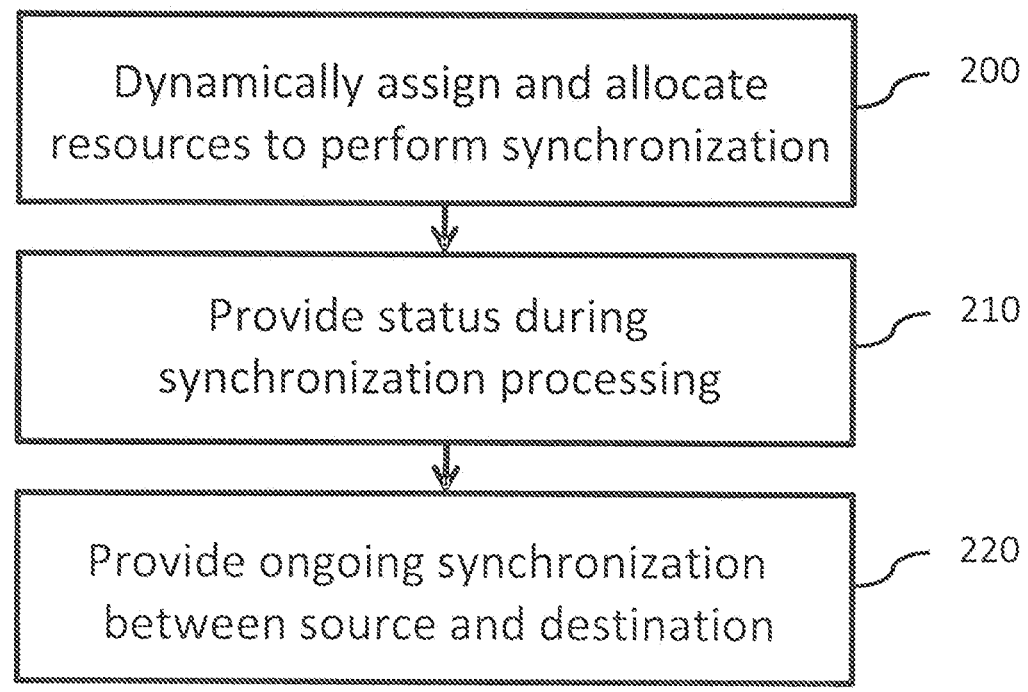
FIG. 1B shows an overview of a flowchart for providing on-demand mailbox account synchronization.

Turning to FIG. 1B, a high-level overview of the steps used to provide on-demand synchronization is shown. At step 200, mailbox synchronization processing tasks are assigned to computing resources. If computing resources are insufficient or unavailable, new computing resources are dynamically allocated. At step 210, status is provided during mailbox synchronization processing. Processing status information allows authorized users to monitor mailbox synchronizations, but also allows the system to determine the availability of computing resources. At step 220, ongoing synchronization between source and destination messaging systems is provided. Ongoing synchronization ensures that changes effected to the source or destination mailbox are replicated in a bi-directional manner.

Figure 1C:
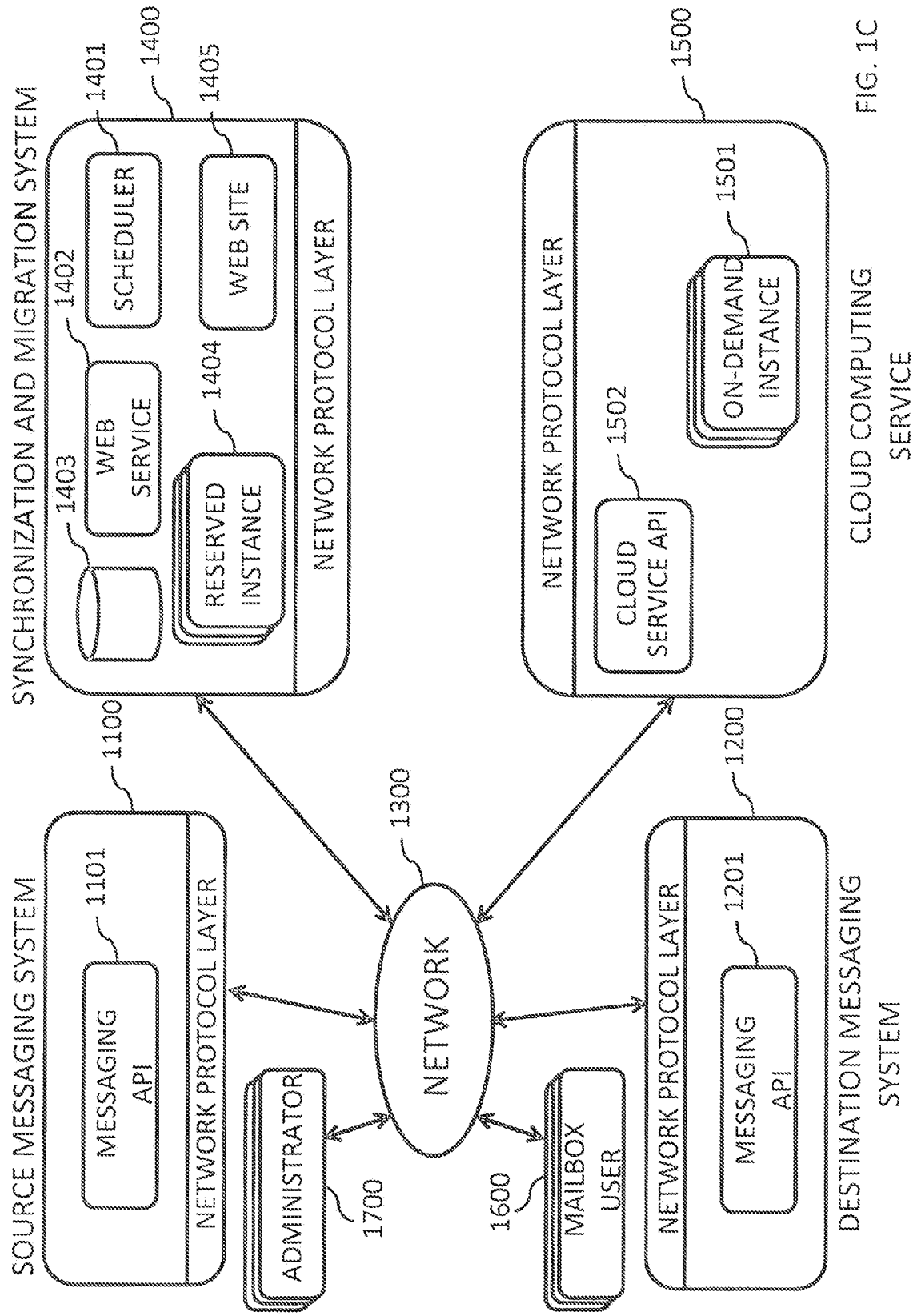
FIG. 1C illustrates an architecture for a network and several components to implement at least one embodiment of the invention.

Turning to FIG. 1C, there is shown a source messaging system 1100 which provides a messaging API 1101, and a destination messaging system 1200 which provides a messaging API 1201. There is also shown a synchronization and migration system 1400 which includes a scheduler 1401, a web service 1402, a configuration repository 1403, one or more reserved instances 1404, and a web site 1405. There is also shown a cloud computing service 1500 providing access to one or more on-demand instances 1501 using a cloud service API 1502. There is also shown one or more mailbox users 1600, and one or more administrators 1700. There is also shown a network 1300 which is a distributed network such as the Internet. Further, each of source messaging system 1100, destination messaging system 1200, synchronization and migration system 1400, and cloud computing service 1500 may operate on one or more computer devices, or similar apparatuses, with memory, processors, and storage devices. For example, a network device such as described below in conjunction with FIG. 1D may be employed to implement one or more of source messaging system 1100, destination messaging system 1200, synchronization and migration system 1400, and cloud computing service 1500.

In further detail, still referring to FIG. 1, source messaging API 1101 and destination messaging API 1201 are accessible from network 1300. Source messaging API 1101 and destination messaging API 1201 typically require authentication, and may implement one or more messaging protocols including but not limited to POP3, IMAP, Delta Sync, MAPI, Gmail, Web DAV, EWS, etc. It should be appreciated that while source and destination roles may remain fixed during migration, they may alternate during synchronization. The synchronization or migration process consists in using messaging APIs to copy mailbox content from source to destination, including but not limited to e-mails, contacts, tasks, appointments, etc. Additional operations may be performed, including but not limited to checking for duplicates, converting content, creating folders, translating e-mail addresses, etc. In the present invention, synchronization and migration system 1400 manages synchronization and migration resources.

Synchronization and migration system 1400 implements web service 1402 and web site 1405, allowing authorized users to submit mailbox processing tasks and monitor their status. Mailbox processing tasks will be referred to as tasks later herein. For programmatic task submission and monitoring, web service 1402 is more suitable because it implements a programmatic interface. For human-based task submission and monitoring, web site 1405 is more suitable because it implements a graphical user interface in the form of web pages. Before a task can be processed, configuration information about source and destination messaging systems 1100 and 1500 must be provided. Additional processing criteria may be specified as well, including but not limited to a list of mailbox object types or folders to process, a date from which processing can start, a specification mapping source and target mailbox folders, a maximum number of mailbox items to process, etc. As will be described in more detail later herein, configuration information may also include administrative or user mailbox credentials. Submitted tasks and configuration information are stored in configuration repository 1403, which may use a persistent location such as a database or files on disk, or a volatile one such as memory.

Synchronization and migration system 1400 implements scheduler 1401 which has access to information in configuration repository 1403. Scheduler 1401 is responsible for allocating and managing computing resources to execute tasks. For this purpose, scheduler 1401 may use reserved instances 1404, which are well-known physical or virtual computers, typically but not necessarily in the same Intranet. In addition, scheduler 1401 may use on-demand instances 1501, which are physical or virtual computers dynamically obtained from one or more cloud service providers 1500, including but not limited to MICROSOFT AZURE from MICROSOFT CORPORATION of Redmond, Wash., or AMAZON WEB SERVICES from AMAZON.COM INC. of Seattle, Wash. Depending on the implementation, only reserved instances, only on-demand instances, or a combination of the two may be used. A possible implementation of the logic used to select and allocate instances will be described later herein.

Scheduler 1401 monitors the status of instances 1404 and 1501. To obtain status information, scheduler 1401 may use cloud service API 1502, require instances 1404 and 1501 to report their status by calling into web service 1403, or connect directly to instances 1404 and 1501. Monitored characteristics may include but are not limited to IP address, last response time, geographical location, processing capacity, network capacity, memory load, processor load, network latency, operating system, execution time, processing errors, processing statistics, etc. Scheduler 1401 may use part or all of this information to assign tasks to instances 1404 and 1501, terminate them, or allocate new ones. A possible implementation of scheduler 1401 will be described later herein.

While reserved instances 1404 may be pre-configured, on-demand instances 1501 are dynamically allocated, and must be configured to run intended binary code using cloud service API 1502. In a possible implementation, on-demand instances 1501 may boot with an initial image, which then downloads and execute binaries from a well-known location such as web service 1402 or web site 1405, but other locations are possible. After being configured to run intended binary code, instances 1404 and 1501 may use web service 1403 to periodically retrieve assigned tasks including corresponding configuration information. In other implementations, scheduler 1401 may directly assign tasks by directly communicating with instances 1404 and 1501 instead of requiring them to poll. A possible implementation of instances 1404 and 1501 will be described later herein.

To facilitate authentication to messaging systems 1100 and 1200, an administrator 1700 may provide administrative credentials using web service 1402 or web site 1405, which are then stored in configuration repository 1403. Administrative credentials are subsequently transmitted to instances 1404 and 1501, allowing them to execute assigned tasks. However, administrative credentials may be unavailable, either because messaging systems 1100 or 1400 do not support administrative access, or because administrative credentials are unknown.

To address this issue, scheduler 1401 may automatically contact mailbox users 1600 and request that they submit mailbox credentials. While different types of communication mechanisms are possible, the scheduler may send e-mail messages to mailbox users 1600 requesting that they submit mailbox credentials. This approach is facilitated by the fact that configuration 1402 contains a list of source and destination mailboxes, including e-mail addresses. In some implementations, scheduler 1401 may send periodic requests for mailbox credentials until supplied by mailbox users. In some implementations, scheduler 1401 may also include a URL link to web site 1405, allowing mailbox users to securely submit credentials over network 1300. Scheduler 1401 may detect when new mailbox credentials have become available, and uses this information to assign executable tasks to instances 1404 and 1501.

Figure 1D:
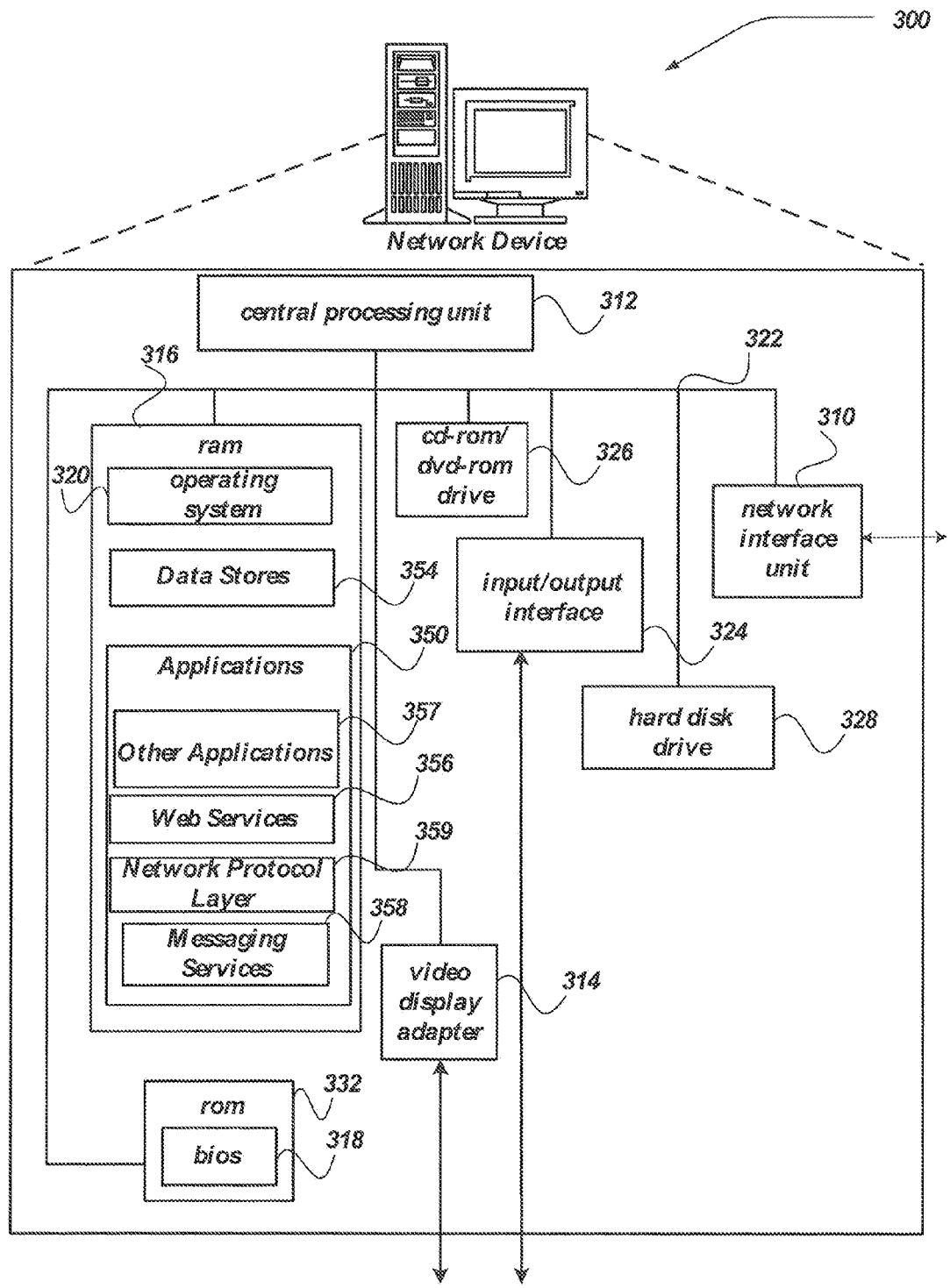
FIG. 1D shows a block diagram of a network device.

FIG. 1D shows one embodiment of a network device 300, according to one embodiment of the invention. Network device 300 may include many more or less components than those shown. The components shown, however, are sufficient to disclose an illustrative embodiment for practicing the invention. Network device 300 may represent one or more of source messaging system 1100, destination messaging system 1200, synchronization and migration system 1400, and cloud computing service 1500, as described above.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 1D, network device 300 also can communicate with the Internet, or some other communications network, via network interface unit 310, which is constructed for use with various communication protocols including the TCP/IP protocol, and/or through the use of Network Protocol Layer 359, or the like. Network interface unit 310 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical, non-transitory medium which can be used to store the desired information and which can be accessed by a computing device.

As shown, data stores 354 may include a database, text, spreadsheet, folder, file, or the like, that may be configured to maintain and store various content. Data stores 354 may also operate as configuration repository 1403 of FIG. 1C, for example. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 356, messaging services 358, and Network Protocol Layer 359, may also be included as application programs within applications 350. However, the invention is not limited to these non-limiting examples, and other applications may also be included, included those discussed above in conjunction with FIG. 1C.

Messaging services 358 may include virtually any computing component or components configured and arranged to forward messages from message user agents, and/or other message servers, or to deliver messages to a local message store, such as data store 354, or the like. Thus, messaging services 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging services 358 may be configured to manage SMS messages, IM, MMS, IRC, RSS feeds, mIRC, or any of a variety of other message types. In one embodiment, messaging services 358 may enable users to initiate and/or otherwise conduct chat sessions, VoIP sessions, or the like. Messaging services 358 may further operate to provide a messaging API, such as Messaging API 1101 of FIG. 1C.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. Web services 356 may operate to provide services such as described elsewhere for Web service 1402 of FIG. 1C.

Network Protocol Layer 359 represents those applications useable to provide communications rules and descriptions that enable communications in or between various computing devices. Such protocols, include, but are not limited to signaling, authentication, error detection and correction capabilities. In one embodiment, at least some of the applications for which Network Protocol Layer 359 represents may be included within operating system 320, and/or within network interface unit 310.

Figure 2:
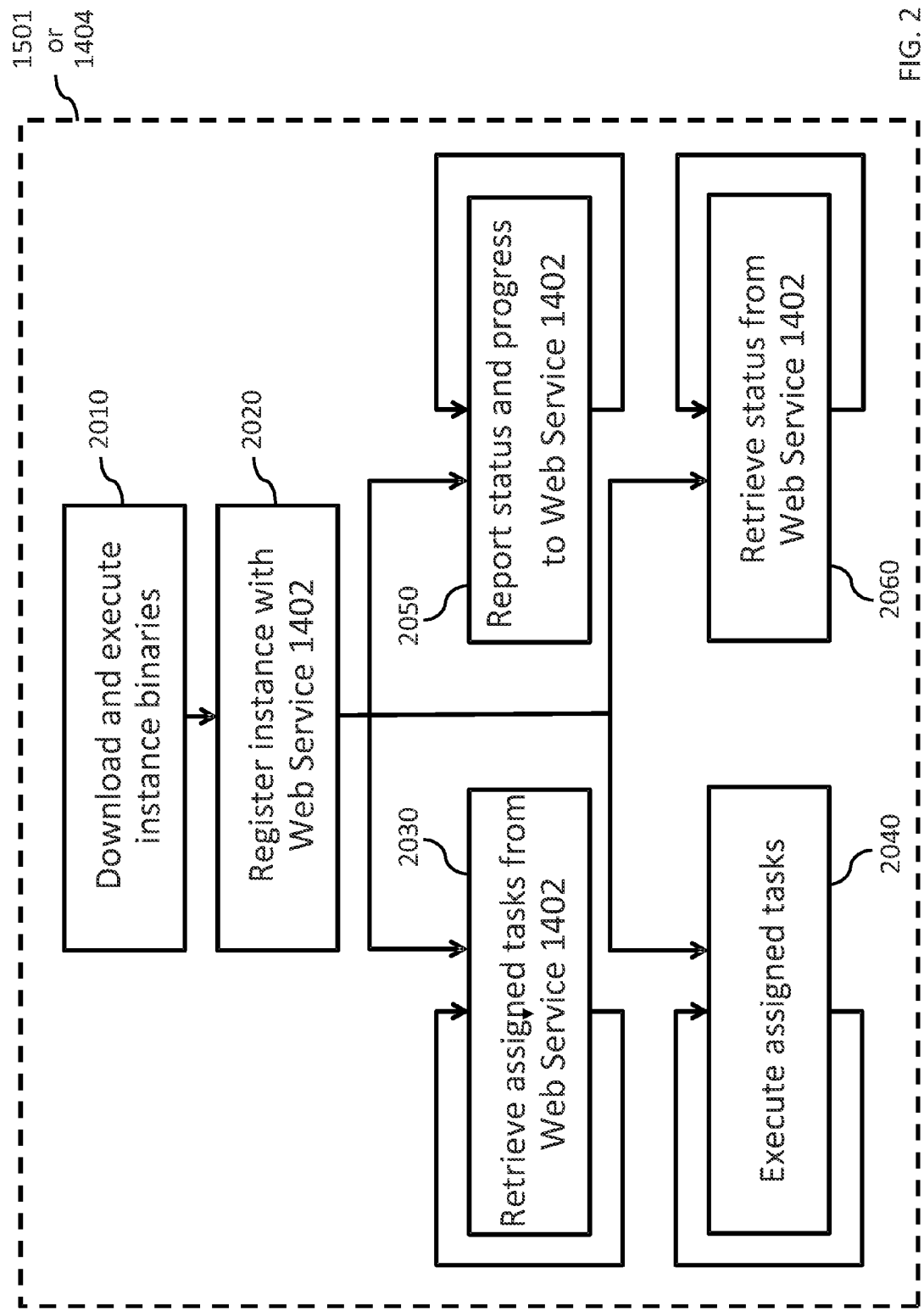
FIG. 2 illustrates a flowchart for processing mailbox accounts.

Turning to FIG. 2, additional details regarding an implementation of instances 1501 and 1404 are provided. The routine begins at operation 2010, during which the instance may check if binaries required for execution are present and up to date. If this is not the case, binaries may be downloaded from a well-known location, installed, and then executed. It should be appreciated that execution of downloaded binaries may require launching a new process. Also, the instance may be pre-configured with a specific version of binaries, in which case operation 2010 may be skipped.

At operation 2020, the instance may call into web service 1402 to request registration with configuration repository 1403 and indicate it is available for processing. This procedure will be referred to as registration process later herein. Information passed as part of the registration process may include some or all previously described monitoring characteristics. From operation 2020, the routine proceeds to several concurrent loops, each executing operation 2030, 2040, 2050, and 2060 respectively.

At operation 2030, the instance may periodically call into web service 1402 to retrieve new tasks assigned by scheduler 1401 to the current instance. Available information may include all configuration information required to perform the task, including information about the target mailbox, the location of source and target systems, and required mailbox credentials. When a new task is found, the instance may notify operation 2040 that it should process it.

At operation 2040, the instance may execute tasks following notifications from operation 2030, and perform various synchronization or migration operations. During execution, progress and error information may be generated. For example, this may include the number of items migrated so far, a list of errors encountered during processing, or the fact that task execution completed, but other indicators are possible.

At operation 2050, the instance may read progress and error information generated by operation 2040, and may periodically call into web service 1402 to publish this information to configuration repository 1403. Even if no new progress or error information is available, the instance may periodically call into web service 1402 to inform it that it still running. As a result, the last response time for the registered instance may be updated in configuration repository 1403. This information may be used by scheduler 1401 to detect unresponsive instances, as will be described later herein.

At operation 2060, the instance periodically may call into web service 1402 to retrieve task status information. Web service 1402 and web site 1405 may allow authorized users to change a task's status, for example to stop or restart it. When a task's status changes, the instance may notify operation 2040 so that it can take action. For example, if a task's status indicates that processing should be stopped, operation 2040 may be notified, and synchronization or migration may be aborted.

It should also be appreciated that executing operations 2030, 2040, 2050, and 2060 concurrently makes it possible for synchronization or migration execution not to be interrupted by calls to web service 1402. However, other implementations may use a different concurrency model, for example a single thread. Also, it should be appreciated that one possible notification mechanism is to use in-memory events to signal notifications, and local files to exchange data. While other implementations are possible, it is preferable to use methods which ensure processing can resume gracefully should the instance be accidentally or intentionally restarted.

Figure 3:
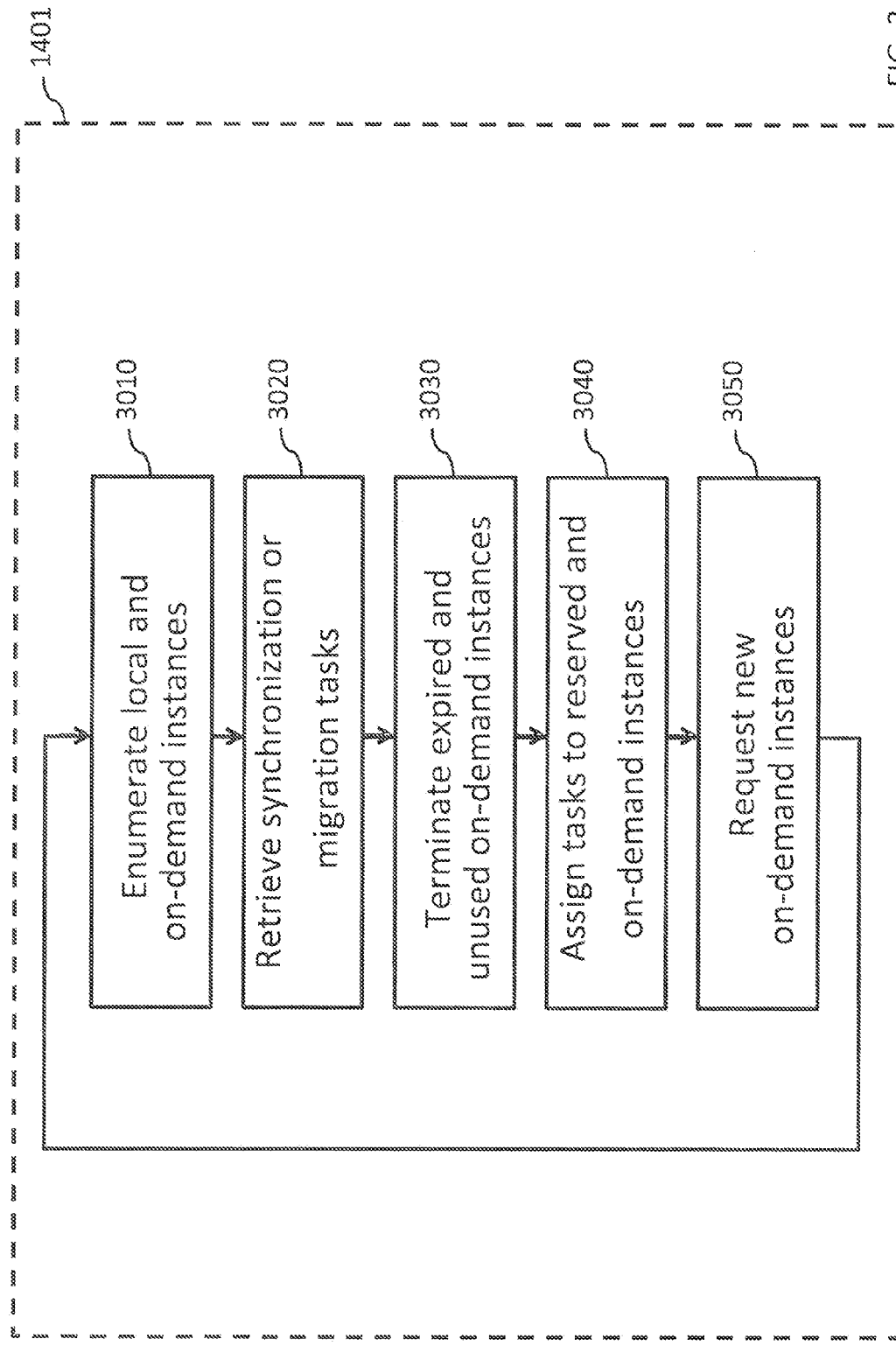
FIGS. 3-7 show flowcharts for providing management of mailbox account resource tasks.

Turning to FIG. 3, additional details regarding an implementation of scheduler 1401 are provided. The routine consists in a loop executed periodically, which begins at operation 3010, during which the scheduler may enumerate reserved and on-demand instances. At operation 3020, the scheduler may retrieve tasks from web service 1402. At operation 3030, the scheduler may terminate expired and unused on-demand instances. At operation 3040, the scheduler may assign tasks to valid instances. At operation 3050, the scheduler may request new on-demand instances if it found during operation 3040 that available resources were insufficient.

Figure 4:
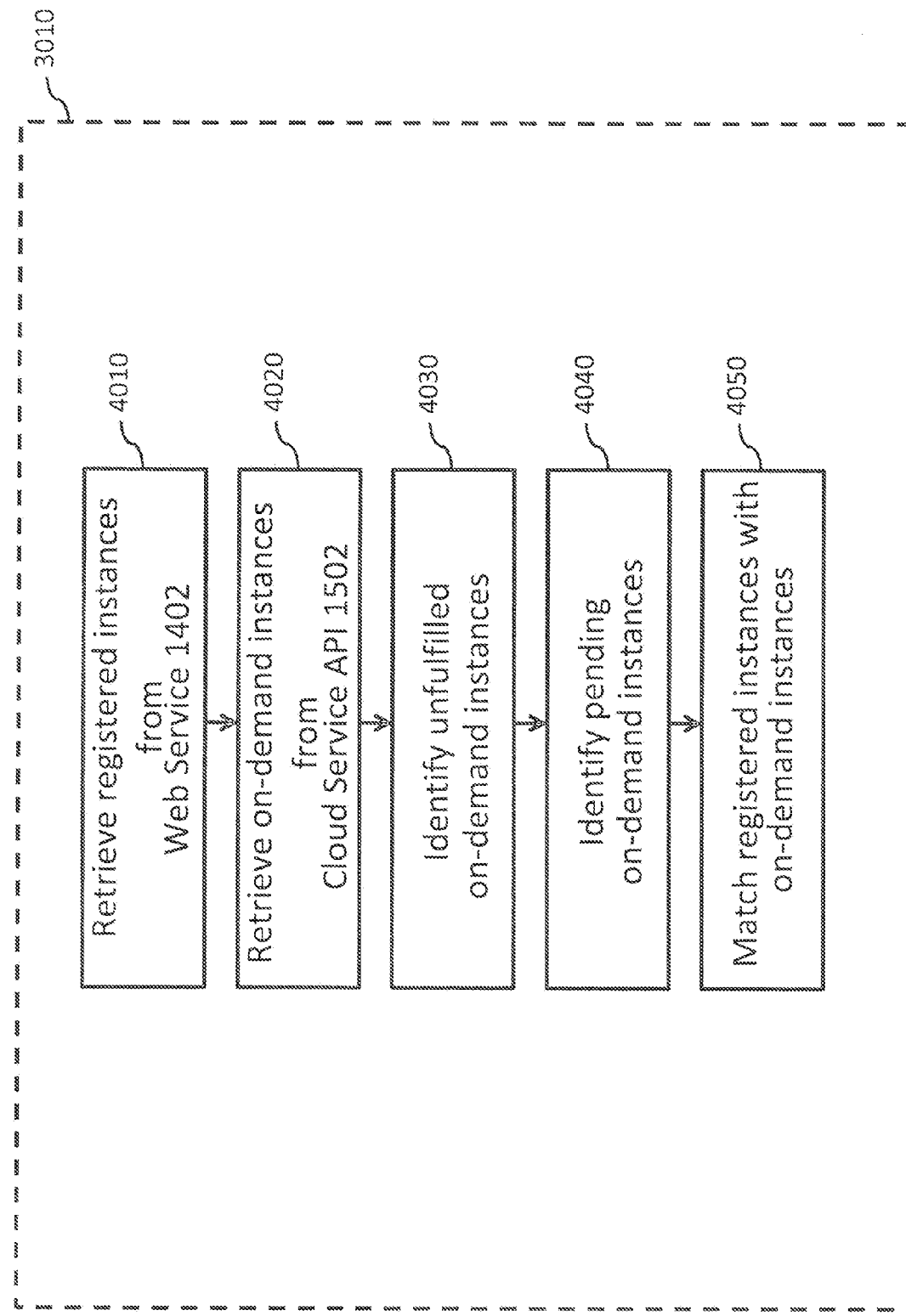

Turning to FIG. 4, additional details regarding an implementation of scheduler operation 3010 are provided. The routine begins at operation 4010, during which the scheduler may retrieve registered instances from configuration repository 1403 using a call to web service 1402. Registered instances consist of reserved instances 1404 and on-demand instances 1501 which have completed the registration process previously described herein.

At operation 4020, the scheduler may use cloud service API 1502 to enumerate all on-demand instances and their states. Most cloud computing services 1500 provide a way to report the state of instances, such as requested, started, failed, canceled, or terminated. Actual states depend on the lifecycle of instances as implemented by cloud computing service 1500.

At operation 4030, the scheduler may use the result of operation 4020 to identify unfulfilled on-demand instances. Unfulfilled on-demand instances are instances which have been requested from cloud computing service 1500, but have not yet advanced to an executable state. Indeed, there often is a delay between the time an on-demand instance is requested and the time it becomes available, for example because the instance must first receive an image and boot.

At operation 4040, the scheduler may use the result of operation 4020 to identify pending on-demand instances. Pending on-demand instances are instances which have advanced to an executable state, but haven't completed the registration process. Indeed, there often is a delay between the time an on-demand instance starts, and the time it completes registration process, for example because it must first download binaries and call into web service 1402.

At operation 4050, the scheduler may match cloud service instances which registered on-demand instances, for example by matching IP addresses. For example, cloud service API 1502 may return the IP address of each running instance, while the registration process may store the IP address of registering instance in configuration repository 1403. As a result of the matching process, the scheduler may identify which on-demand instances have completed the registration process, and which have not.

Figure 5:
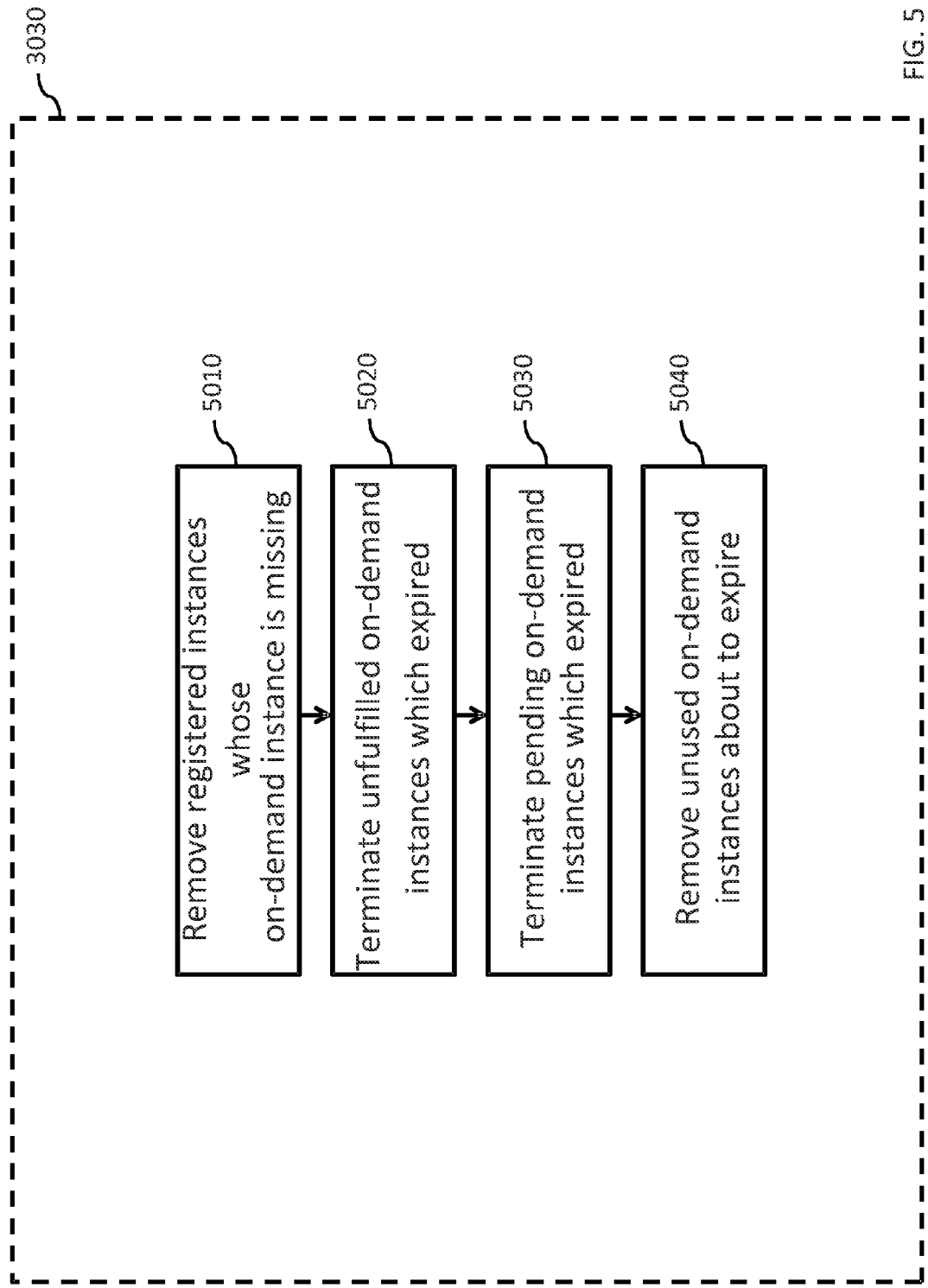

Turning to FIG. 5, additional details regarding an implementation of scheduler operation 3030 are provided. The routine begins at operation 5010, during which the scheduler may use the result of operation 4050 to identify on-demand instances registered in configuration repository 1403, but which cloud service API 1502 reports as missing, unavailable, canceled, failed, or terminated. This may happen if a new on-demand instance was started, completed the registration process, but for example was terminated. For those instances, the scheduler removes corresponding registration information from configuration repository 1403.

At operation 5020, the scheduler may use the result of operation 4030 to identify on-demand instances which remained unfulfilled for a time period exceeding a configurable value. This may happen if a request for a new on-demand instance could not be satisfied by cloud computing service 1500 within a reasonable amount of time, for example due to system downtime. For those instances, the scheduler sends a cancellation request to cloud service API 1502.

At operation 5030, the scheduler may use the result of operation 4040 to identify on-demand instances which remained pending for a time period exceeding a configurable value. This may happen if a new on-demand instance advanced to an executable state as reported by cloud service API 1502, but failed to complete the registration process, for example because it was unable to download binaries. For those instances, the scheduler sends a termination request to cloud service API 1502.

At operation 5040, the scheduler may identify on-demand instances which have no task assigned to them, and whose paid-for time slot is about to expire. For example, if cloud computing service 1500 uses a per-hour pricing model, on-demand instances with no task assigned to them may be terminated a few minutes before the current paid-for hour expires. This provision ensures that computing resources remain available until the paid-for lease expires. For those instances, the scheduler sends a termination request to cloud service API 1502.

Figure 6:
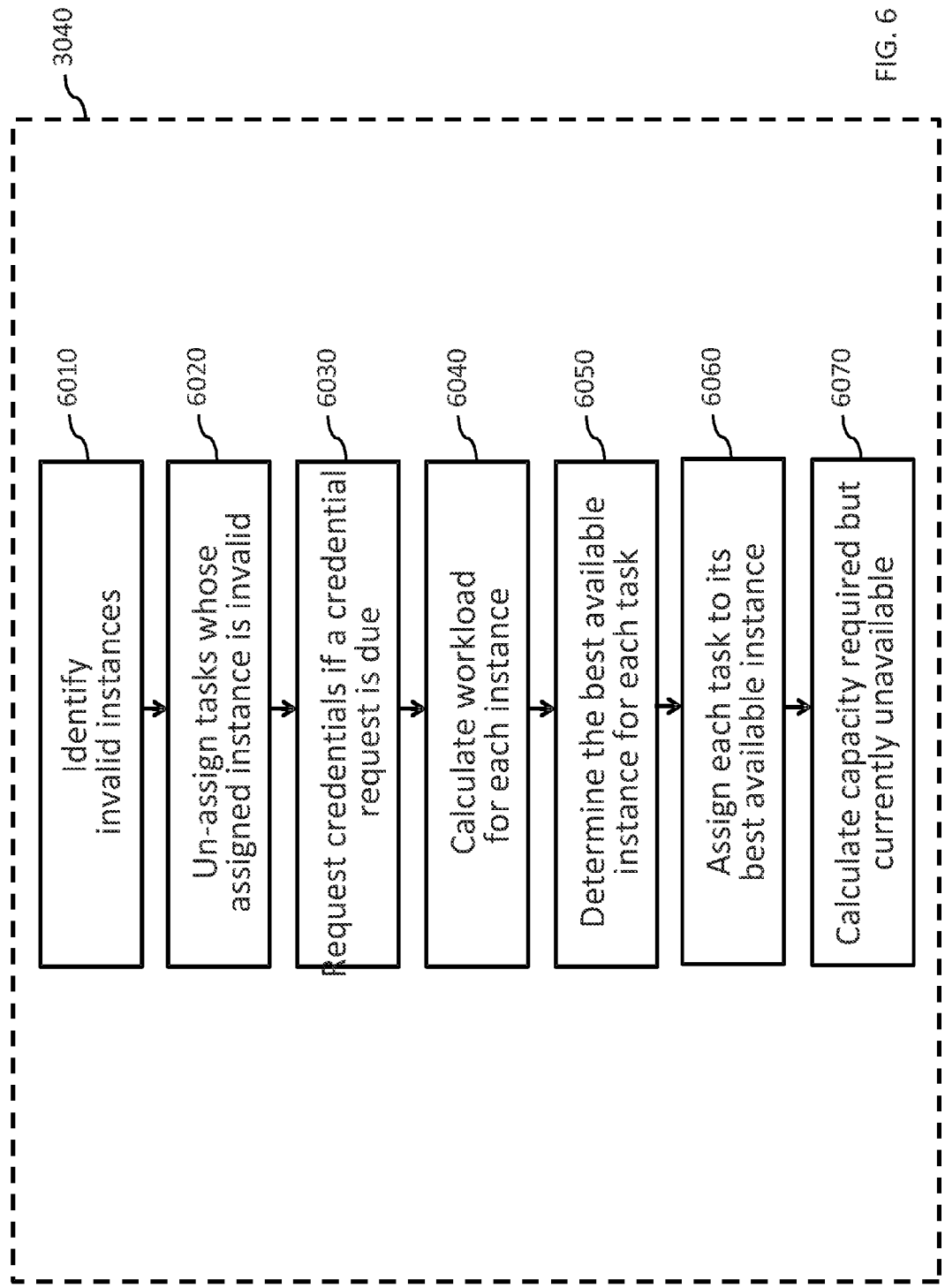

Turning to FIG. 6, additional details regarding an implementation of scheduler operation 3040 are provided. The routine begins at operation 6010, during which the scheduler may identify invalid instances. Invalid instances may include instances which are no longer registered in configuration repository 1403, instances whose last response time in configuration repository 1403 is older than a configurable value, instances which have reported they cannot continue execution, etc.

At operation 6020, the scheduler may use the result of operation 6010 to find tasks whose assigned instance is invalid, and un-assign them. Depending on the implementation, the un-assignment may be performed only in memory, or persisted to configuration repository 1403 using a call to web service 1402. In both cases, such tasks qualify for re-assignment. On advantage of persisting un-assignment is that instances can use web service 1402 to detect un-assignment, and take actions such as closing connections or releasing memory.

At operation 6030, the scheduler may determine if a task requires mailbox credentials to be provided. If so, the scheduler decides whether a request for mailbox credentials should be sent. To ensure requests are sent to users at regular intervals, the date at which the last request was sent may be persisted, for example in configuration repository 1403 using a call to web service 1402. In addition to a time interval, other parameters may be used, including but not limited to a maximum number of requests to send per user, a date range restricting when requests can be sent, etc.

At operation 6040, the scheduler may calculate the workload associated with each instance. In one implementation, to measure workload, the scheduler may simply count the number of tasks assigned to each instance. However, other methods are possible. For example, the scheduler could use a more sophisticated method taking into consideration progress information published by operation 2050 and stored in configuration repository 1403, for example processor and memory load.

At operation 6050, the scheduler may identify tasks which are unassigned and can execute. Whether a task can execute may depend on whether required mailbox credentials have been provided. It may also depend on other parameters, including but not limited to a date range restricting execution time, a maximum number of connections allowed to a messaging system, etc. For each unassigned task which can execute, the scheduler determines the best available instance.

It should be appreciated that several mechanisms for selecting the best available instance are possible. In most cases, the mechanism employed will use workload information produced by operation 6040, and instance capacity information stored in configuration repository 1403. In a possible implementation, the scheduler first considers valid reserved instances whose current workload is less than their respective capacity. Among those, the scheduler selects the reserved instance with the lowest workload to capacity ratio. In other terms, the scheduler favors the least busy available reserved instance. Because reserved instances are dedicated resources, the scheduler tries to distribute tasks evenly between them.

However, if no such reserved instance is available, the scheduler considers valid on-demand instances whose current workload is less than their respective capacity. Among those, the scheduler selects the instance with the highest workload to capacity ratio. In other terms, the scheduler favors the most busy available on-demand instance. Because on-demand instances are often paid for based on utilization time, the scheduler tries to assign as many tasks as possible to each on-demand instance. In addition, options stored in configuration repository 1403 may affect assignment. For example, an option may specify that a particular task should execute only on reserved instances, or execute only in a particular geographic location to comply with data transmission legislation or to improve performance.

At operation 6060, the scheduler may use the result of operation 6050 to assign each such task to its best possible instance, and may store assignment information in configuration repository 1403 using a call to web service 1402. Further, as part of the assignment process, the scheduler may also reassign tasks. For example, the scheduler may reassign tasks from on-demand instances to reserved instances if it found that some reserved instances became available. One reason for doing this is to reduce costs associated with running on-demand instances in addition to reserved instances. Indeed, reserved instances can be seen as a fixed cost, while on-demand instances can be seen as an additional cost.

At operation 6070, the scheduler may identify tasks which could not be assigned to an on-demand instance, for example because all on-demand instances were over capacity. The scheduler may then calculate a value called the insufficient processing capacity, which in one implementation may simply be the number of tasks which could not be assigned during a scheduling cycle. More sophisticated measures based on the amount of work to be performed by each unassigned task are also possible. For example, in one implementation, the size of each mailbox to process may be used to calculate the insufficient processing capacity.

Figure 7:
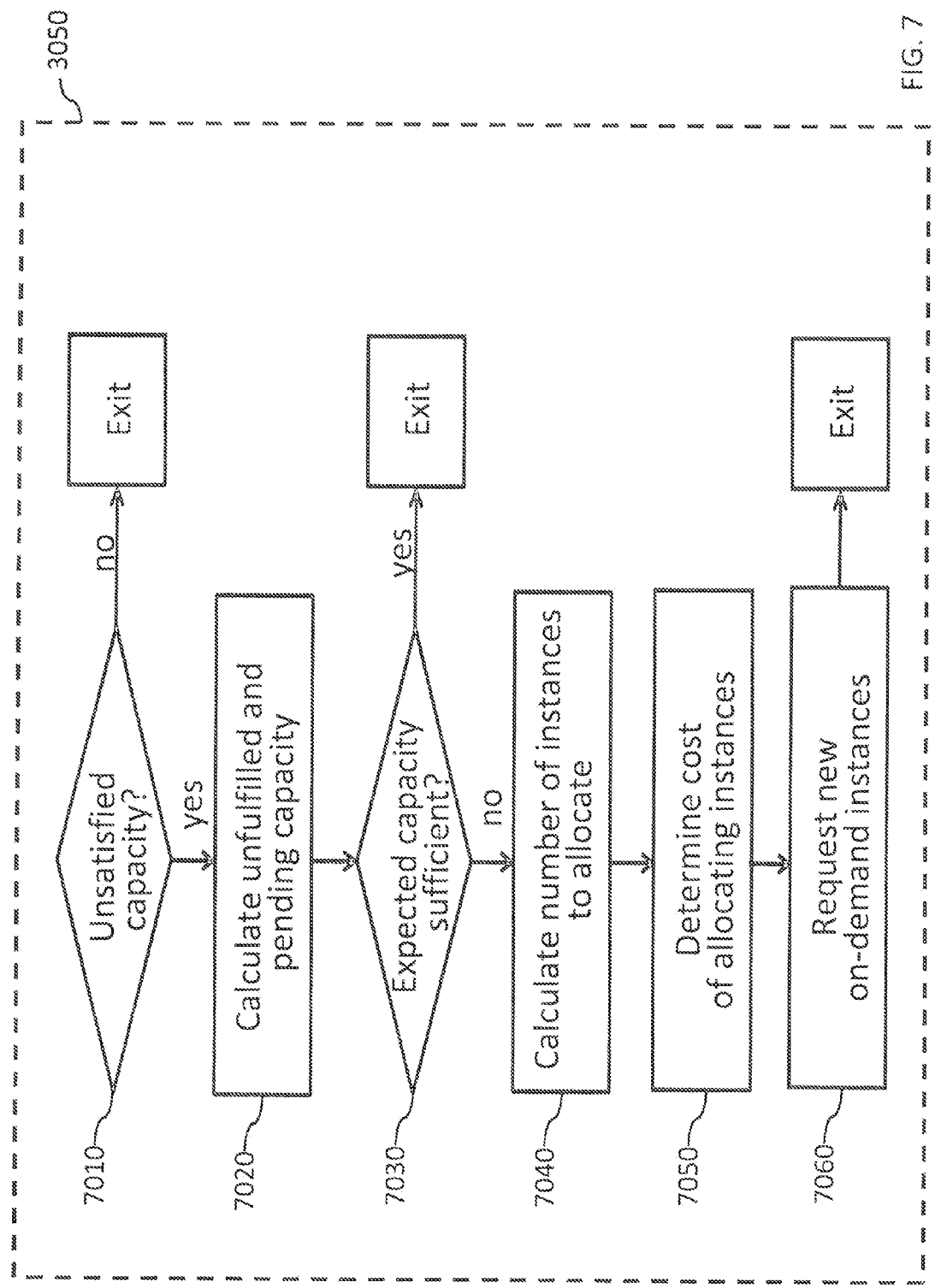

Turning now to FIG. 7, additional details regarding an implementation of scheduler operation 3050 are provided. The routine begins at test 7010, during which the scheduler may use the result of operation 6070 to determine if insufficient processing capacity was reported. If no insufficient processing capacity was reported, the routine terminates, otherwise it advances to operation 7020.

At operation 7020, the scheduler may use the result of operations 4030 and 4040 to determine how many on-demand instances have been requested but have not yet completed the registration process. More specifically, the scheduler may calculate the expected processing capacity which should become available once unfulfilled and pending on-demand resources complete the registration process.

At test 7030, the scheduler may compare the result of operation 6070 with the result of operation 7020. If the expected processing capacity is greater than or equal to the insufficient processing capacity, the routine terminates, otherwise it advances to operation 7040.

At operation 7040, the scheduler may calculate how many additional on-demand instances should be requested. The calculation is based on the difference between the expected processing capacity and the insufficient processing capacity, and based on the capacity each on-demand instance is expected to provide.

At operation 7050, the scheduler may determine the cost of allocating new on-demand instances to absorb unsatisfied workload. It should be appreciated that different mechanisms to obtain cost-efficient on-demand instance are possible. For example, before requesting new on-demand instances, the price of on-demand instances may be compared across multiple cloud computing services 1500. Also, cloud service API 1502 may allow callers to bid for on-demand instances instead of paying a fixed price. If so, bidding may be leveraged to obtain on-demand instances at lower prices. Note that underbidding may result in longer delays between the time an on-demand instance is requested and the time the request is fulfilled. Also, if the bid is too low, the request may never be fulfilled. However, the logic described herein, in particular operations 5020 and 5030, are designed to detect and handle such situations. Also, if scheduler 1401 finds that on-demand instances cannot be obtained quickly enough using bidding, it may automatically increase the bid price, or revert to the fixed price method for a configurable amount of time. Finally, scheduler 1401 may delay allocation of new on-demand instances if there are indications (for example based on historical values) that the current price will decrease within a configurable amount of time.

At operation 7060, the scheduler may use the result of operation 7050 to request allocation of new on-demand instances using cloud service API 1502, after which the routine terminates. As previously described herein, certain constraints such as a particular geographical location may be imposed when requesting on-demand instances.

It should be appreciated that functionality provided by scheduler 1401 may be implemented using different mechanisms than previously described herein. For example, some operations may be executed in a different order, may not be implemented, or may be implemented partially. For example, functionality may be implemented as code running within one or more independent processes, or may be implemented as code running within configuration repository 1403. For example, scheduler 1401 may have direct access to configuration repository 1403, in which case using web service 1402 to access configuration information may not be required. For example, scheduler 1401 may also communicate directly with instances 1404 and 1501, in which case instances may need not poll web service 1402, and the scheduler may need not persist task assignments in configuration repository 1403. For example, multiple instances of scheduler 1401 may be used to improve reliability or performance.

Figure 8:
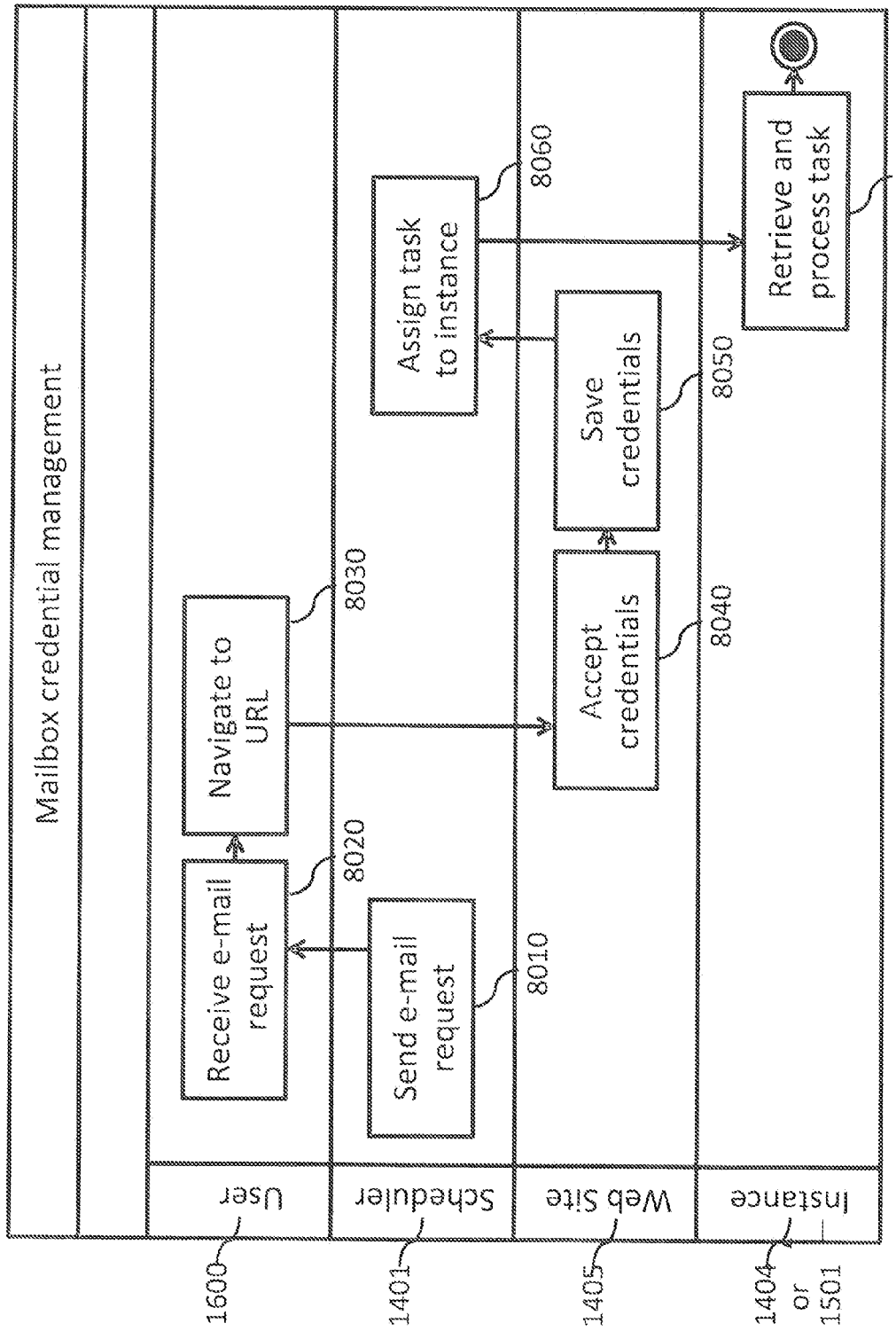
FIG. 8 illustrates a block diagram for providing management of mailbox account credentials in accordance with the invention.

Turning now to FIG. 8, additional details regarding processing of mailbox credentials are provided. At block 8010, scheduler 1401 may find a task for which mailbox credentials are required, but haven't been supplied. Scheduler 1401 may send an e-mail message to mailbox user 1600, including a link to a secure web page on web site 1405. At block 8020, mailbox user 1600 may receive the e-mail message. At block 8030, mailbox user 1600 may click on or navigate to the link, and be presented with a secure web page from web site 1405 requesting mailbox credentials. At block 8040, web site 1405 may accept credentials submitted by mailbox user 1600. At block 8050, web site 1405 may store credentials in configuration repository 1403. At block 8060, scheduler 1401 may process the task again but now find that mailbox credentials are available in configuration repository 1403. Scheduler 1401 may then assign the task to an instance 1404 or 1501. At block 8070, the selected instance 1404 or 1501 may discover that a task has been assigned to it, obtain configuration information including mailbox credentials, and commence synchronization or migration processing.

The advantages of the present invention include, without limitation, that it allows dynamic allocation of computing resources for cost-effective, efficient mailbox synchronization and migration. It also facilitates management by automating the obtainment of mailbox credentials, and by automating the process of scheduling synchronization or migration workload. The invention enables large-scale synchronization or migrations, even with limited local computing resources available or without knowledge of administrative credentials.

In broad embodiment, the present invention is a system for managing physical and logical resources to provide dynamic on-demand processing capacity for a variety of purposes. Further, it will be understood that each block of the processes in the illustrations, and combinations of blocks in the process illustrations, can be implemented by computer program instructions. These program instructions may be provided to a processor and memory device to produce a machine, such as a computer device, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the process block or blocks. The computer program instructions may also cause at least some of the operational steps shown in the blocks of the processes to be performed in parallel. Moreover, some of the steps may also be performed across more than one processor, such as might arise in a multi-processor computer system, such as a plurality of computer devices. In addition, one or more blocks or combinations of blocks in the illustrations may also be performed concurrently with other blocks or combinations of blocks, or even in a different sequence than illustrated without departing from the scope or spirit of the invention.

While the description of the present invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, methods, and examples, but by all embodiments and methods within the scope and spirit of the invention as claimed.

What is claimed is:

1. A method, comprising:

receiving, with a migration system, configuration information about a source and a destination electronic messaging system, including identification of a plurality of mailboxes associated with the source electronic messaging system;

migrating mailbox content associated with the plurality of mailboxes from the source to the destination electronic messaging system, wherein said migrating includes dynamically allocating computing resources including a plurality of instances to provide sufficient processing capacity for migration of the mailbox content associated with the plurality of mailboxes from the source electronic messaging system to the destination electronic messaging system, wherein the plurality of instances comprise one or more reserved instances or one or more on-demand instances, the on-demand instances obtained from one or more cloud service providers;

determining a workload associated with each of the instances;

assigning each task of a plurality of tasks involved in said migrating to an instance of the plurality of instances based on the determined workload associated with each of the plurality of instances; and providing status information regarding the migrating.

2. The method of claim 1, further comprising prioritizing the computing resources assigned based on at least one of cost, geographic location, bandwidth, availability, security, type, or speed.

3. The method of claim 1, wherein the configuration information includes a messaging protocol employed by the source electronic messaging system, the destination electronic messaging system, or both.

4. The method of claim 1, further comprising:

receiving at least one of administrative credentials for accessing each mailbox of the plurality of mailboxes, user credentials for accessing a mailbox of the plurality of mailboxes, or a combination thereof.

5. The method of claim 4, further comprising:

prompting one or more users for the user credentials.

6. The method of claim 1, wherein assigning each task of a plurality of tasks to an instance of the plurality of instances based on the determined workload associated with each of the plurality of instances is further based on a workload to capacity ratio of each instance of the plurality of instances.

7. The method of claim 1, wherein the plurality of instances includes one or more on-demand instances obtained from one or more cloud service providers and one or more reserved instances.

8. The method of claim 1, wherein migrating mailbox content associated with the plurality of mailboxes from the source electronic messaging system to the destination electronic messaging system includes migrating at least one of an e-mail, a task, a contact, an instant message, a text, a chat, a calendar, a folder, or a document.

9. An apparatus, comprising:

a memory component; and a processing component that is arranged to operate on data to enable actions, the actions comprising:

receiving, with a migration system, configuration information about a source and a destination electronic messaging system, including identification of a plurality of mailboxes associated with the source electronic messaging system;

migrating mailbox content associated with the plurality of mailboxes from the source to the destination electronic messaging system, wherein said migrating includes dynamically allocating computing resources including a plurality of instances to provide sufficient processing capacity for migration of the mailbox content associated with the plurality of mailboxes from the source electronic messaging system to the destination electronic messaging system, wherein the plurality of instances comprise one or more reserved instances or one or more on-demand instances; the on-demand instances obtained from one or more cloud service providers;

determining a workload associated with each of the instances;

assigning each task of a plurality of tasks involved in said migrating to an instance of the plurality of instances based on the determined workload associated with each of the plurality of instances; and providing status information regarding the migrating.

10. The apparatus of claim 9, wherein the actions further comprise prioritizing the computing resources assigned based on at least one of cost, geographic location, bandwidth, availability, security, type, or speed.

11. The apparatus of claim 9, wherein the configuration information includes a messaging protocol employed by the source electronic messaging system, the destination electronic messaging system, or both.

12. The apparatus of claim 9, wherein dynamically allocating computing resources including a plurality of instances to provide sufficient processing capacity for migration of the mailbox content associated with the plurality of mailboxes from the source electronic messaging system to the destination electronic messaging system comprises:

dynamically allocating computing resources responsive to determining that the computing resources have insufficient processing capacity to execute each task of the plurality of tasks.

13. The apparatus of claim 9, wherein assigning each task of a plurality of tasks to an instance of the plurality of instances based on the determined workload associated with each of the plurality of instances is further based on a workload to capacity ratio of each instance of the plurality of instances.

14. The apparatus of claim 9, wherein dynamically allocating computing resources including a plurality of instances to provide sufficient processing capacity for migration of the mailbox content associated with the plurality of mailboxes from the source messaging system to the destination messaging system comprises:

determining the size of each mailbox of the plurality of mailboxes; and determining the sufficient processing capacity based on the size of each mailbox of the plurality of mailboxes.

15. The apparatus of claim 9, wherein each mailbox of the plurality of mailboxes are mailboxes of a first type and wherein at least one task of the plurality of tasks includes translating a mailbox of the plurality of mailboxes to a mailbox of a second type.

16. The method of claim 9, wherein migrating mailbox content associated with the plurality of mailboxes from the source to the destination electronic messaging system includes migrating at least one of an e-mail, a task, a contact, an instant message, a text, a chat, a calendar, a folder, or a document.

17. A method comprising:

enumerating a plurality of instances, each of the plurality of instances configured to execute one or more computing tasks associated with migration of mailbox content from a source electronic messaging system to a destination electronic messaging system, wherein the plurality of instances comprise one or more reserved instances or one or more on-demand instances, the on-demand instances obtained from one or more cloud service providers;

terminating a first instance of the plurality of instances;

determining a workload of each instance of the instances;

assigning a task of the one or more computing tasks to a second instance of the plurality of instances based on the determined workload; and requesting new instances.

18. The method of claim 17, wherein enumerating a plurality of instances comprises:

enumerating the plurality of instances and states of the plurality of instances;

identifying unfilled instances of the plurality of instances;

identifying pending instances of the plurality of instances; and identifying registered and unregistered instances of the plurality of instances.

19. The method of claim 17, wherein terminating a first instance of the plurality of instances comprises:
identifying instances of the plurality of instances that are unfulfilled for a time period exceeding a first threshold;
identifying instances of the plurality of instances that are pending for a time period exceeding a second threshold; and
identifying instances of the plurality of instances that have no assigned task.

20. The method of claim 17, wherein assigning a task of the one or more computing tasks to a second instance of the plurality of instances based on the determined workload comprises:
assigning the task to the second instance responsive to determining that the current workload of the second instance is less than the capacity of the second instance.

21. The method of claim 17, wherein requesting new instances comprises:
determining whether an insufficient processing capacity exceeds an expected processing capacity;
if the insufficient processing capacity is greater than the insufficient processing capacity, determining a number of instances based on a difference between the insufficient processing capacity and the expected processing capacity; and
requesting the number of instances.

22. The method of claim 17, wherein assigning a task of the one or more computing tasks to a second instance of the plurality of instances includes assigning a task to migrate at least one of an e-mail, a task, a contact, an instant message, a text, a chat, a calendar, a folder, or a document.

23. An apparatus, comprising:
a memory component; and
a processing component that is arranged to operate on data to enable actions, the actions comprising:
enumerating a plurality of instances, each of the plurality of instances configured to execute one or more computing tasks associated with migration of mailbox content from a source electronic messaging system to a destination electronic messaging system, wherein the plurality of instances comprise one or more reserved instances or one or more on-demand instances, the on-demand instances obtained from one or more cloud service providers;
terminating a first instance of the plurality of instances;
determining a workload of each instance of the instances;
assigning a task of the one or more computing tasks to a second instance of the plurality of instances based on the determined workload; and
requesting new instances.

24. The apparatus of claim 23, wherein enumerating a plurality of instances comprises:
enumerating the plurality of instances and states of the plurality of instances;
identifying unfilled instances of the plurality of instances;
identifying pending instances of the plurality of instances; and
identifying registered and unregistered instances of the plurality of instances.

25. The apparatus of claim 23, wherein assigning a task of a plurality of tasks to a second instance of the plurality of instances based on the determined workload comprises:
assigning the task to the second instance responsive to determining that the current workload of the second instance is less than the capacity of the second instance.

26. The apparatus of claim 23, further comprising:
retrieving the plurality of tasks from a web service.

27. The apparatus of claim 26, wherein retrieving the plurality of tasks from a web service comprises:
retrieving configuration information associated with each task of the plurality of tasks, information associated with one or more mailboxes, a location of the source electronic messaging system, a location of the destination electronic messaging system, mailbox credentials, or a combination thereof.

28. The apparatus of claim 23, wherein assigning a task of the one or more computing tasks to a second instance of the plurality of instances includes assigning a task to migrate at least one of an e-mail, a task, a contact, an instant message, a text, a chat, a calendar, a folder, or a document.

29. The method of claim 1, wherein assigning each task of a plurality of tasks involved in said migrating to an instance of the plurality of instances based on the determined workload associated with each of the plurality of instances further comprises:
prioritizing assigning tasks to reserved instances whose current workload is less than their respective capacity.

30. The apparatus of claim 9, wherein assigning each task of a plurality of tasks involved in said migrating to an instance of the plurality of instances based on the determined workload associated with each of the plurality of instances further comprises:
prioritizing assigning tasks to reserved instances whose current workload is less than their respective capacity.

31. The method of claim 1, further comprising reassigning a task from an on-demand instance to a reserved instances responsive to determining that the reserved instance became available.

32. The apparatus of claim 9, wherein the actions further comprise reassigning a task from an on-demand instance to a reserved instances responsive to determining that the reserved instance became available.

33. The method of claim 17, further comprising reassigning a task from an on-demand instance to a reserved instances responsive to determining that the reserved instance became available.

34. The apparatus of claim 23, wherein the actions further comprise reassigning a task from an on-demand instance to a reserved instances responsive to determining that the reserved instance became available.

35. The method of claim 1, further comprising responsive to determining that an expected processing capacity of an instance is less than or equal to an insufficient processing capacity of the instance, requesting allocation of new on-demand instances using a cloud service API of one of at least one of the one or more cloud service providers.

36. The apparatus of claim 9, wherein the actions further comprise responsive to determining that an expected processing capacity of an instance is less than or equal to an insufficient processing capacity of the instance, requesting allocation of new on-demand instances using a cloud service API of one of at least one of the one or more cloud service providers.

37. The method of claim 17, further comprising responsive to determining that an expected processing capacity of an instance is less than or equal to an insufficient processing capacity of the instance, requesting allocation of new on-demand instances using a cloud service API of one of at least one of the one or more cloud service providers.

38. The apparatus of claim 23, wherein the actions further comprise responsive to determining that an expected processing capacity of an instance is less than or equal to an insufficient processing capacity of the instance, requesting allocation of new on-demand instances using a cloud service API of one of at least one of the one or more cloud service providers.

* * * * *